(12) United States Patent
Morali et al.

(10) Patent No.: US 8,355,897 B2
(45) Date of Patent: Jan. 15, 2013

(54) GENERATION OF CONTROLS FOR A SIMULATOR MOBILE PLATFORM

(75) Inventors: Nathan Morali, Marseille (FR); Serge Couvet, Jouy le Moutier (FR)

(73) Assignee: Thales, Neuilly sur Seine (FR)

( * ) Notice: Subject to any disclaimer, the term of this patent is extended or adjusted under 35 U.S.C. 154(b) by 380 days.

(21) Appl. No.: 12/559,472

(22) Filed: Sep. 14, 2009

(65) Prior Publication Data
US 2010/0070248 A1    Mar. 18, 2010

(30) Foreign Application Priority Data

Sep. 12, 2008 (FR) ..................................... 08 05020

(51) Int. Cl.
*G06F 17/50* (2006.01)
*G09B 9/02* (2006.01)
(52) U.S. Cl. .................... 703/2; 703/5; 434/28; 434/29; 434/55; 702/112
(58) Field of Classification Search .................. 703/2, 5; 434/28, 29, 55; 702/112
See application file for complete search history.

(56) References Cited

U.S. PATENT DOCUMENTS

| | | | | |
|---|---|---|---|---|
| 6,027,342 | A * | 2/2000 | Brown | 434/55 |
| 2002/0055086 | A1 * | 5/2002 | Hodgetts et al. | 434/37 |
| 2004/0230394 | A1 * | 11/2004 | Saari et al. | 702/113 |
| 2007/0233280 | A1 * | 10/2007 | Bacon et al. | 700/1 |
| 2008/0124683 | A1 * | 5/2008 | Medford | 434/29 |
| 2010/0145511 | A1 * | 6/2010 | Popa et al. | 700/245 |
| 2010/0273132 | A1 * | 10/2010 | Dutt et al. | 434/29 |

OTHER PUBLICATIONS

Wang, et al., 2004. "Predictive washout filter design for vr-based motion simulator." 2004 IEEE International Conference on Systems, Man and Cybernetics 7: 6291-6295.
Schwarz, C., W., 2007. "Two Mitigation Strategies for Motion System Limits in Driving and Flight Simulators." IEEE Transactions on Systems, Man, and Cybernetics. Part A: Systems and Humans 37(4): 562-568.

* cited by examiner

*Primary Examiner* — Thai Phan
(74) *Attorney, Agent, or Firm* — Stroock & Stroock & Lavan LLP

(57) ABSTRACT

The present invention relates to a method for generating motion controls for a mobile platform of a vehicle simulator. The method uses, as input, accelerations calculated by a process for simulating the behavior of the vehicle. The method according to the invention comprises the steps of: filtering the accelerations calculated accelerations by use of a filter constructed according to a mathematical model of human perception of a motion; calculating successive positions of the mobile platform as a function of the filtered acceleration controls; scaling the positions of the mobile platform as a function of physical limitations of the mobile platform, to produce scaled successive positions of the mobile platform; and calculating acceleration controls to be applied by the mobile platform, as a function of the scaled successive positions of the mobile platform, to produce calculated acceleration controls.

12 Claims, 6 Drawing Sheets

GENERATION OF CONTROLS FOR A SIMULATOR MOBILE PLATFORM

CROSS REFERENCE TO RELATED APPLICATIONS

The present application claims priority to French Patent Application Serial No. 08/05020, filed on Sep. 12, 2008, the contents of which are hereby incorporated by reference in its entirety.

FIELD OF THE INVENTION

The present invention relates to a method and a device for generating motion controls for a mobile platform of a vehicle simulator.

DESCRIPTION OF PRIOR ART

Most of the time, pilots of vehicles such as airplanes, trucks and helicopters, are trained by virtue of simulators reproducing behaviors of the vehicle. The objective of a simulator is notably to reproduce a virtual environment representing a real setting in which the vehicle is deploying and also the control station of the vehicle. The simulator therefore generally comprises a driver station at the center of an audiovisual device making it possible to reproduce an outside environment. This type of simulator, a so-called motionless simulator, does not reproduce the motions of the vehicle. Motionless simulators give rise, for the pilot using them, to sensations of slowness. These sensations of slowness are related to an inertia of the simulated vehicle which seems to be less reactive than a real vehicle. The sensation of slowness is particularly prejudicial when training pilots to react rapidly if faced with a dangerous situation. For example, tracking a trajectory with a motionless simulator requires corrections of low frequency, with a large amplitude, this hardly being realistic. Moreover, long duration training may induce nauseous states for drivers.

In order to alleviate the aforesaid drawbacks, most vehicle simulators use mobile simulation platforms to reproduce attitudes and accelerations of the simulated vehicle. The mobile platforms allow more realistic reproduction of sensations felt by a driver of a vehicle in a real situation. The performance of the drivers, thus trained, is thereby enhanced relative to the use of a motionless simulator.

Mobile platforms can have up to six degrees of freedom, including three degrees in rotation and three degrees in translation. These degrees of freedom make it possible to reproduce motions of pitch, roll, yaw, surge, sway and heave, depending on the simulated vehicle. A standard kinematics of a mobile platform is that of the Stewart platform, implementing six hydraulic or electric actuators in order to move a vehicle control cabin. This type of platform with motion can only imperfectly reproduce the sensations felt by the driver. Indeed, physical constraints, related to a maximum elongation of the actuators, limits the field of the drivers possible perceptions. For example, a typical value of maximum elongation for actuators used in aircraft simulators is one and a half meters. This maximum elongation does not make it possible to simulate accelerations of long duration for example. However, the human brain being particularly sensitive to variation in acceleration, that is to say to the third derivative of position, more satisfactory physiological effects can be obtained with limited actuator lengths, by using for example artifices. Certain artifices make it possible notably to reproduce long-duration effects. For example, pitching the nose of the cabin up, carried out with an angular velocity below a threshold of human perception, gives an impression of linear acceleration prolonged by the effect of the weight of the body on the back of the pilot's seat.

Mobile platforms are controlled by control algorithms which take account of the physical limitations of the platform. Simulation platform control algorithms make it possible to generate controls to be applied by the platform so as to carry out a motion of the control cabin in accordance with instructions originating from simulation software. Control algorithms have evolved little over the last thirty years, notably, the algorithm used to produce a control for the platform generally comprises the following steps:
- a first step in the course of which accelerations originating from a simulated vehicle are divided by two, and then used as input to calculate the control;
- the accelerations can thereafter be transformed into load factors, in the course of a second step, or else can pass through a filter whose coefficients are optimized empirically and then multiplied by a gain.

The result of these operations is an acceleration provided to the mobile platform in the form of a control.

The control behaves as a filter whose coefficients are determined in an empirical manner. In addition to reproducing to within a scale factor the accelerations of the real vehicle at the level of the pilot's head, the objective of the control . is also to bring the platform back to a neutral position. The calculation of the load factors and the filtering serve to optimize the sensation produced by the motions of the platform. The gain makes it possible to reduce the amplitude of the motions of the platform so as to avoid driving the actuators into mechanical bumpers. Driving the actuators into the bumpers results notably in premature wear of the actuators, which are particularly expensive to replace. The existing algorithms make it possible to bound the values of the controls to be taken into account by the platform so as to reduce the amplitude of the motion of the platform. The controls of the motion of the platform lead to unsatisfactory reproduction of sensations. Moreover, to guarantee that the platform will not bump, safety margins are taken into account in calculating the control. The safety margins restrict the domain of use as a function of the mechanical capabilities of the system notably in terms of usable length of actuators and therefore in terms of feeling of the acceleration by the pilot.

SUMMARY OF THE INVENTION

A possible improvement can consist in defining bounds of use of the platform as a function of the domain of use of the real vehicle such as the flight domain for an aircraft. Globally, the performance induced by the use of this improvement is not satisfactory in regard to reproduction of sensations as well as in terms of compliance with the mechanical constraints of the platform.

An aim of the invention is notably to alleviate the aforesaid drawbacks. For this purpose, the subject of the invention is a method for calculating motion controls for a mobile platform of a vehicle simulator. The method uses notably, as input, accelerations calculated by software for simulating the behavior of the vehicle. The method comprises notably the following steps:
- a first calculation of acceleration controls to be applied by the platform, filtering the accelerations calculated with the aid of a filter constructed according to a mathematical model of human perception of a motion;
- a second calculation of successive positions of the platform as a function of the filtered acceleration controls;
- a scaling of the positions of the platform as a function of the physical limitations of the platform;
- a third calculation of the acceleration controls to be applied by the platform, as a function of the scaled successive positions of the platform.

The positions of the platform can be defined by the positions of the geometric center of the platform and by the lengths of the actuators moving the platform.

The length of the actuators can be scaled by a first scaling function scaling(l), for example such that:

$$scaling: R^+ \to [l_{min}, l_{max}]$$

with $$Avec: scaling(l) = \begin{cases} \geq l_{min}, \forall l \leq l_{min} \\ = l, \forall l \in [l_{min}, l_{max}] \\ \leq l_{max}, \forall l \geq l_{max} \\ \left(\dfrac{d\,scaling}{dl}\right)_{\substack{l=l_{min} \\ l=l_{max}}} = 0 \end{cases}$$

where
- l represents a length of an actuator;
- $l_{min}$ represents a minimum physically possible length to be implemented by the platform;
- $l_{max}$ represents a maximum physically possible length to be implemented by the platform.

The scaling of the positions can take account of limitations on rate of elongation of the actuators of the platform.

The limitations on rate of elongation of the actuators can be taken into account using a second scaling function $scaling_v(v)$, for example such that:

$$scaling_v: R \to [v_{min}, v_{max}]$$

with $$avec: scaling_v(v) = \begin{cases} \geq v_{min}, \forall v \leq v_{min} \\ = v, \forall v \in [v_{min}, v_{max}] \\ \leq v_{max}, \forall v \geq v_{max} \\ \left(\dfrac{d\,scaling_v}{dv}\right)_{\substack{v=v_{min} \\ v=v_{max}}} = 0 \end{cases}$$

where
- v represents a rate of elongation of an actuator;
- $v_{min}$ represents a minimum elongation rate physically achievable by the actuators of the platform;
- $v_{max}$ represents a maximum elongation rate physically possible by the actuators of the platform.

The accelerations provided by the simulation software can be compared with a threshold value below which the accelerations are no longer perceived by a human being. Only the accelerations above the threshold value give for example a control to be applied by the mobile platform.

The third calculation of the acceleration controls can apply a Newton algorithm in an iterative manner.

The subject of the present invention is also a device for calculating motion controls for a mobile platform of a vehicle simulator. The device according to the invention comprises notably:
- a first block for calculating acceleration controls to be applied by the platform by filtering accelerations provided by software for simulating the behavior of the vehicle, with the aid of a filter constructed according to a mathematical model of human perception of a motion;
- a second block for calculating controls to be applied by the platform as a function of physical limitations of the platform.

The second block can comprise:
- a first module for calculating successive positions of the platform as a function of the accelerations of controls to be applied by the platform;
- a second module for scaling the positions calculated as a function of the physical limitations of the platform;
- a third module calculating accelerations to be applied by the platform as a function of the scaled positions.

The positions of the platform can be defined by the positions of the geometric center of the platform and by the lengths of the actuators of the platform.

The length of the actuators can be scaled by a first scaling function scaling(l), for example such that:

$$scaling: R^+ \to [l_{min}, l_{max}]$$

with $$Avec: scaling(l) = \begin{cases} \geq l_{min}, \forall l \leq l_{min} \\ = l, \forall l \in [l_{min}, l_{max}] \\ \leq l_{max}, \forall l \geq l_{max} \\ \left(\dfrac{d\,scaling}{dl}\right)_{\substack{l=l_{min} \\ l=l_{max}}} = 0 \end{cases}$$

where
- l represents a length of an actuator,
- $l_{min}$ represents a minimum physically possible length to be implemented by the platform;
- $l_{max}$ represents a maximum physically possible length to be implemented by the platform.

The scaling of the positions can take account of limitations on rate of elongation of the actuators of the platform.

The limitations on rate of elongation of the actuators can be taken into account using a second scaling function $scaling_v(v)$ for example such that:

$$scaling_v: R \to [v_{min}, v_{max}]$$

with $$avec: scaling_v(v) = \begin{cases} \geq v_{min}, \forall v \leq v_{min} \\ = v, \forall v \in [v_{min}, v_{max}] \\ \leq v_{max}, \forall v \geq v_{max} \\ \left(\dfrac{d\,scaling_v}{dv}\right)_{\substack{v=v_{min} \\ v=v_{max}}} = 0 \end{cases}$$

where
- v represents a rate of elongation of an actuator;
- $v_{min}$ represents a minimum elongation rate physically achievable by the actuators of the platform;
- $v_{max}$ represents a maximum elongation rate physically possible by the actuators, of the platform.

The main advantages of the invention are notably that it is simple and inexpensive to implement and can be adapted to multiple mobile simulation platforms.

BRIEF DESCRIPTION OF THE DRAWINGS

Other characteristics and advantages of the invention will become apparent with the aid of the description which follows, given by way of nonlimiting illustration and with regard to the appended drawings which represent.

MORE DETAILED DESCRIPTION

Figure 1:
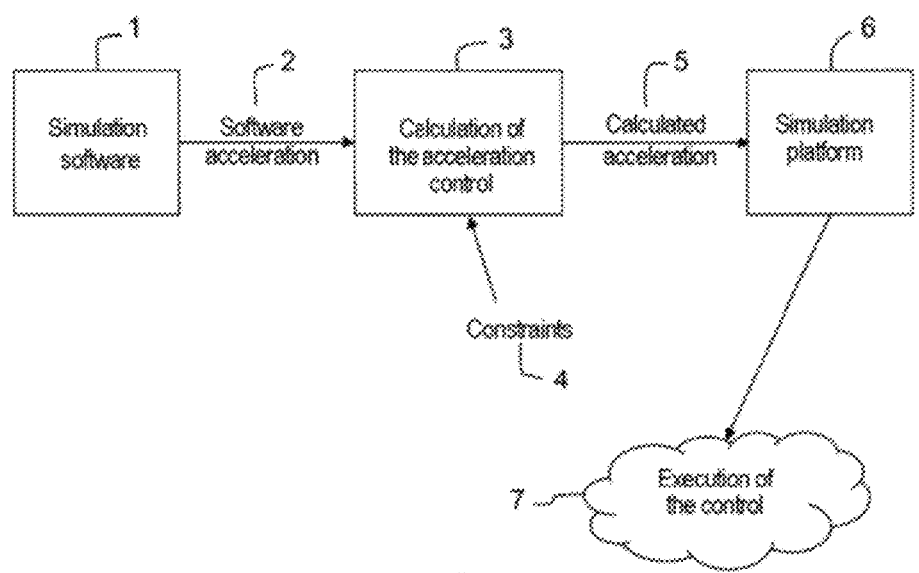
FIG. 1: a schematic example of various control steps for a simulation platform according to the prior art.

FIG. 1 represents a schematic of various control steps for a vehicle simulation mobile platform, according to the prior art.

Training to drive a vehicle uses notably simulation software 1 making it possible to reproduce virtually the movements of the vehicle as well as the evolution of the environment of the vehicle in the course of the movements. The simulation software 1 makes it possible for example to take account of the controls of a pilot of the vehicle so as to cause the simulated vehicle to deploy accordingly, while reproducing the real behavior of the vehicle in a similar case. The simulation software 1 calculates a software acceleration 2 characteristic of the real motion of the vehicle. Next a first module 3 calculates an acceleration control to be applied to the platform while taking account of the mechanical constraints 4 of the platform. The acceleration control thus calculated takes the form of a calculated acceleration 5, provided to the simulation platform 6, which applies it so as to execute the acceleration control 7.

The acceleration control 7 can be calculated by dividing the input acceleration by a factor so as to guarantee compliance with the physical constraints of the simulation platform.

This type of acceleration control calculation according to the prior art does not make it possible to ensure realistic representation of the accelerations felt by a pilot of a real vehicle. Indeed, the accelerations that can be implemented are limited and therefore do not make it possible to reproduce an acceleration of long duration, for example. Moreover, the platform system is not used in an optimal manner. Indeed, significant zones of incursion of the actuators are never invoked so as to guard against the wearing of the actuators by avoiding bringing them to an end-of-stroke bumper. Moreover, the acceleration division factor takes no account of very strong and sudden accelerations which may thus damage the platform system.

Figure 2:
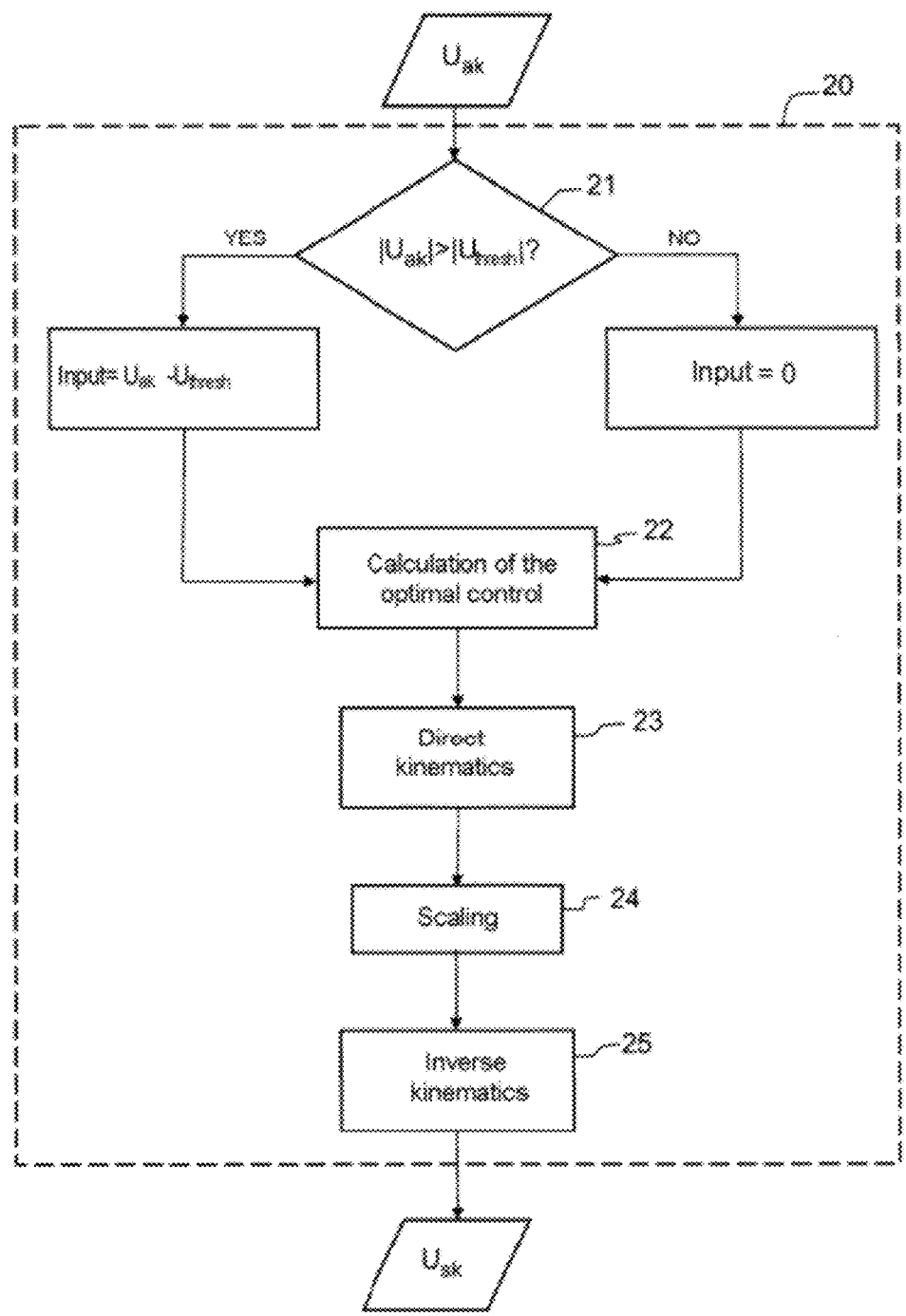
FIG. 2: a schematic of various possible steps of calculating a control for a simulation platform according to the invention.

FIG. 2 represents a schematic example of several possible steps 21, 22, 23, 24, 25 for calculating an acceleration control for a vehicle simulator. A succession of the steps for calculating an acceleration control forms a method for generating controls for a simulator mobile platform 20 according to the invention.

Simulation software 1 provides one or more accelerations $U_{ak}$ of the simulated vehicle, also dubbed software accelerations. In the course of a first step 21 of thresholding of the software acceleration $U_{ak}$, the modulus of the acceleration $U_{ak}$ of the simulated vehicle is compared with the modulus of a threshold acceleration $U_{thresh}$. The threshold acceleration $U_{thresh}$ corresponds to an acceleration value short of which the acceleration of the simulated vehicle is not perceived by a human being. When the modulus of the acceleration $U_{ak}$ is strictly greater than the modulus of the threshold acceleration $U_{thresh}$, the acceleration used as input to the calculation of an acceleration control is the difference between the acceleration of the simulated vehicle $U_{ak}$ and the threshold acceleration $U_{thresh}$. When the modulus of the acceleration $U_{ak}$ is less than or equal to the modulus of the threshold acceleration $U_{thresh}$, then the acceleration used as input to the calculation of an acceleration control is zero. In this case, no control is calculated.

A second step 22 of the method 20 according to the invention is a step of calculating an acceleration control 22, termed the optimal control, as a function of the input acceleration, defined in the course of the first step 21. The calculation of the optimal control 22 uses a mathematical model, in the form of a transfer function. The mathematical model represents a human perception of the attitudes and accelerations of the real vehicle, by way of various organs of the inner ear. Such a mathematical model of sensations can use the model developed by R. Telban and F. Cardullo to apply a procedure termed optimal control notably described in the following publication: "Motion Cueing Algorithms: A human centered approach, State University of New York at Binghampton, NASA Langley Research Center Hampton, Va.". Other mathematical models of perception can also be used without it being necessary to modify the method 20 according to the invention. The procedure for calculating the optimal control uses a filter applied to the acceleration defined in the course of the first step 21. The filter makes it possible to obtain an acceleration to be imposed on the simulation platform so as to reproduce sensations close to the accelerations felt in a real case.

A third step 23 of the method 20 according to the invention is a direct kinematics calculation step 23. The direct kinematics makes it possible to pass from a calculated control acceleration, the optimal control calculated in the course of the second step 22, to the positions of actuators which propel the mobile platform. The kinematics calculation makes it possible to determine the following kinematic data:
- positions of the centroid of the mobile platform;
- lengths of the actuators;
- rates of elongation of the actuators, such as they would be if the optimal acceleration control arising from the second step 22 were applied directly.

Generally, in a system of parallel forces having fixed points of application, the point through which their resultant constantly passes, whatever the direction of these forces, is dubbed the centroid of the system. In the present invention, the system is a mobile platform, the centroid is then the center of gravity of the mobile platform.

A fourth step 24 of the method 20 according to the invention is a step 24 of scaling the lengths calculated in the course of the direct kinematics step 23. The scaling step 24 makes it possible to ensure compliance with the physical constraints of the mobile platform. The lengths of the actuators must, indeed, remain between a minimum length and a maximum length, achievable by the mobile platform. The scaling of the actuator lengths can be carried out by using for example a scaling function: scaling(l) such that:

$$\text{scaling}: R^+ \to [l_{min}, l_{max}] \quad (1000)$$

with $$Avec{:}\text{scaling}(l) = \begin{cases} \geq l_{min}, & \forall l \leq l_{min} \\ = l, & \forall l \in [l_{min}, l_{max}] \\ \leq l_{max}, & \forall l \geq l_{max} \\ \left(\dfrac{d\,scaling}{dl}\right)_{\substack{l=l_{min}\\l=l_{max}}} = 0 \end{cases}$$

where l represents a length of an actuator calculated in the course of the direct kinematics step 23;

$l_{min}$ represents a minimum physically possible length to be implemented by the platform;

$l^{max}$ represents a maximum physically possible length to be implemented by the platform;

the condition $$\left(\dfrac{d\,scaling}{dl}\right)_{\substack{l=l_{min}\\l=l_{max}}} = 0$$

corresponds to a condition applicable to the derivatives of the function scaling(l) making it possible to avoid discontinuities in the rates of displacement of the platform.

Indeed, discontinuities in the rates of displacement of the mobile platform lead to pulses at the level of the accelerations which impede the feeling of the sensations by the pilot of the simulated vehicle. Avoiding rate discontinuities therefore makes it possible to improve the feeling of the motion by the pilot of the simulated vehicle.

Compliance with the physical constraints of the mobile platform also requires that the rates of displacement of the platform be constrained. The rates of displacement of the platform correspond to the rates of application of the lengths of the actuators calculated in the course of the direct kinematics step 23. The rates of displacement of the platform can be constrained by using a function for scaling the rates taking the rate of displacement of the mobile platform as parameter:

$$\text{scaling}_v: R \to [v_{min}, v_{max}] \quad (1002)$$

with $$avec{:}\text{scaling}_v(v) = \begin{cases} \geq v_{min}, & \forall v \leq v_{min} \\ = v, & \forall v \in [v_{min}, v_{max}] \\ \leq v_{max}, & \forall v \geq v_{max} \\ \left(\dfrac{d\,scaling_v}{dv}\right)_{\substack{v=v_{min}\\v=v_{max}}} = 0 \end{cases}$$

where v represents a rate of elongation of an actuator calculated in the course of the direct kinematics step 23;

$v_{min}$ represents a minimum elongation rate physically achievable for the actuators of the mobile platform;

$v_{max}$ represents a maximum elongation rate physically possible for the actuators of the mobile platform.

the condition $$\left(\dfrac{d\,scaling_v}{dv}\right)_{\substack{v=v_{min}\\v=v_{max}}} = 0$$

corresponds to a condition applicable to the derivatives of the function $scaling_v(v)$ making it possible to avoid discontinuities of the accelerations in the displacement of the mobile platform, also making it possible to improve the feeling of the motion.

The scaled lengths and rates of elongation are then compatible with the mechanical limits of the mobile platform. The scaling step 24 therefore advantageously makes it possible to introduce, into the method according to the invention for calculating the optimal control, a simulation of the kinematics of the platform so as to avoid situations in which the actuators would reach an end of stroke. This advantageously makes it possible to preserve the lifetime of the actuators and therefore of the mobile platform system. Avoiding situations where the actuators are at the end of their stroke makes it possible, advantageously, to avoid unrealistic spurious sensations caused by impacts of the actuators on elastomers damping the ends of stroke of the actuators.

A fifth step 25 is an inverse kinematics calculation step 25 which makes it possible, by using a Newton algorithm in an iterative manner, to pass back from the actuator lengths, calculated in the course of the scaling step 24, to the position of the centroid of the mobile platform, and then to the control accelerations $U_{sk}$ necessary for the displacement of the mobile platform. The control accelerations $U_{sk}$ then allow displacement of the platform with actuator lengths corrected as a function of the performance of the platform.

Figure 3:
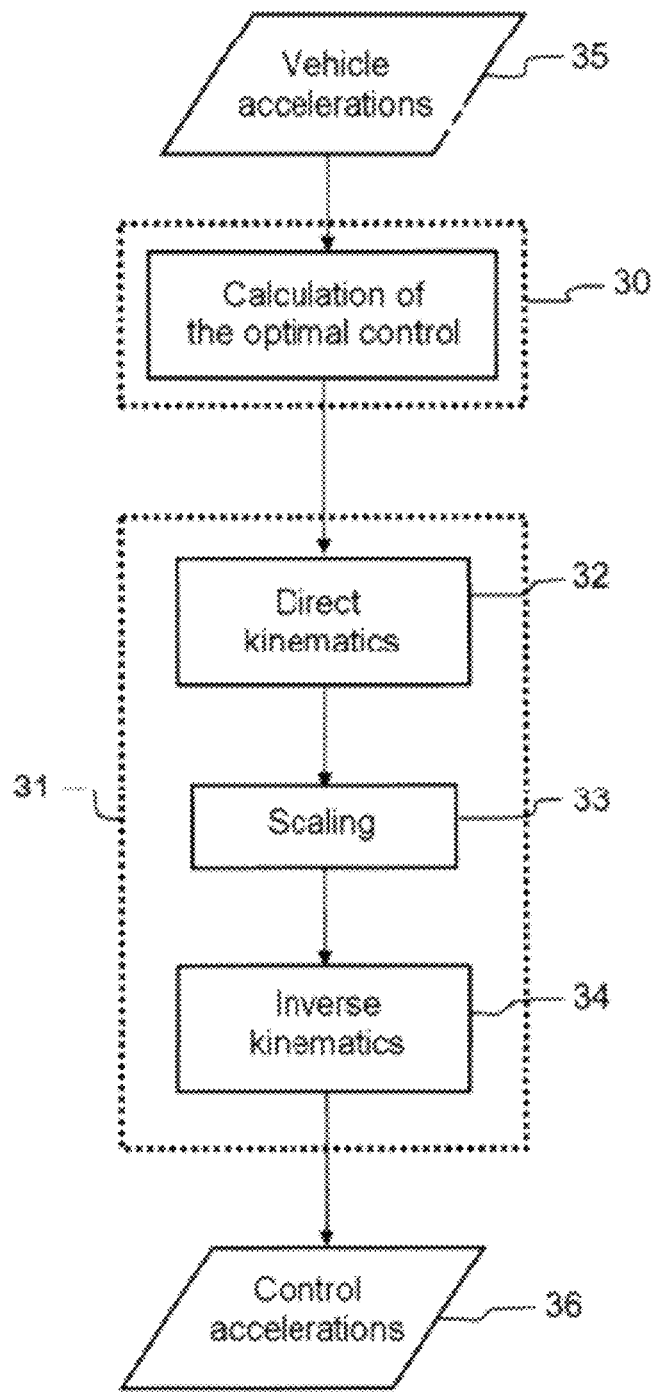
FIG. 3: a diagram of various blocks for calculating the control of the simulation platform according to the invention.

FIG. 3 represents an example of a functional architecture defining various blocks 30, 31 for implementing the method for generating acceleration controls 20 according to the invention. The various functional blocks 30, 31 can be parts of a program executing on one or more processors of a computer.

A first functional block 30 can be a block which ensures the calculation of the optimal control as a function of the accelerations of a vehicle 35 such as the software accelerations $U_{sk}$. The calculation of the optimal control 30 comprises notably the first and second steps 21, 22 of the method according to the invention.

A second functional block 31 comprises various processing modules 32, 33, 34, ensuring that the optimal control calculated by the first functional block 30 complies with the physical constraints of the platform. The second functional block 31 comprises notably:

a first direct kinematics calculation module 32, implementing the direct kinematics calculation step 23 of the method 20 according to the invention;

a second scaling module 33, carrying out the step 24 of scaling the lengths calculated in the course of the direct kinematics calculation step 23 of the method 20 according to the invention;

a third inverse kinematics calculation module 34, implementing the step of calculating the inverse kinematics 25 of the method 20 according to the invention.

The second functional block 31 provides control accelerations 36 to the mobile platform.

The direct kinematics module 32 and inverse kinematics module 34 depend solely on the geometry of the mobile platform. The direct kinematics module 32 and inverse kinematics module 34 are therefore adaptable to any type of simulator with motion without it being necessary to modify the functional architecture of the program implementing the method 20 according to the invention.

Figure 4:
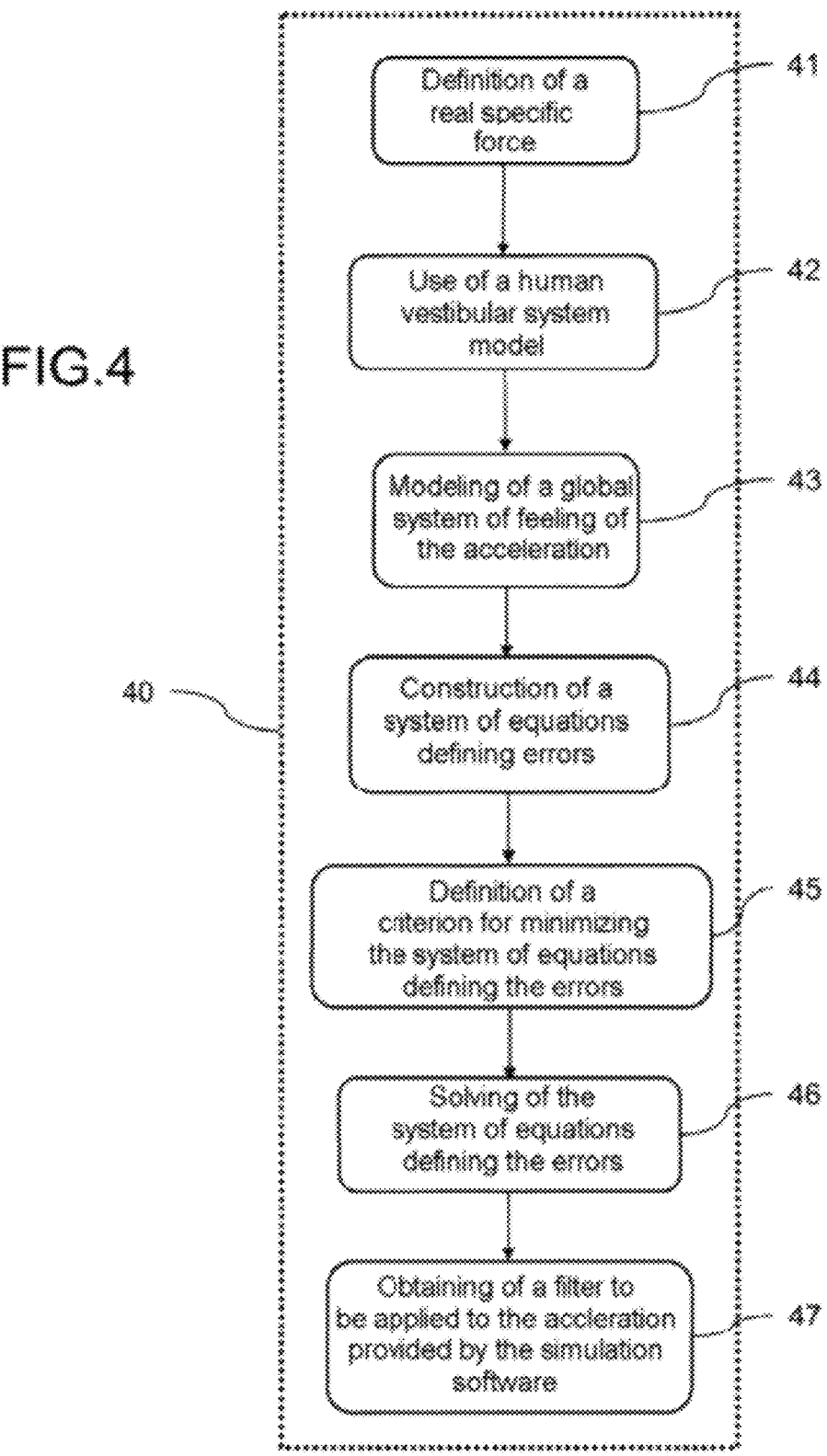
FIG. 4: a schematic of various possible steps of obtaining a filter for the calculation of an acceleration control.

FIG. 4 represents various possible steps 40 for obtaining a filter applicable for the calculation of the optimal control 22 represented in FIG. 2.

The filter for calculating the optimal control can notably be determined in the following manner:
- definition 41 of a real specific force applied to the pilot of the simulated vehicle as a function of the acceleration $U_{ak}$ provided by the vehicle simulation software 1;
- use 42 of models of a human vestibular system to define the ratios on the one hand between the specific force felt by the pilot and the real specific force applied to the pilot, and on the other hand between the angular velocity felt by the pilot and the real angular velocity applied to the pilot;
- modeling 43 of a global system of feeling of the acceleration by the pilot of the vehicle as a function of the vestibular system model;
- construction 44 of a system of equations defining:
  - an error of sensation of the pilot of the simulator with respect to the feeling of a pilot of a real vehicle;
  - an error between the state of a real vehicle and the state of the simulated vehicle;
- definition 45 of a criterion for minimizing the system of equations defining the errors;
- solution 46 of the system of equations defining the errors, as a function of the minimizing criterion defined;
- obtaining 47 of a filter to be applied to the acceleration $U_{ak}$ provided by the simulation software 1 so as to obtain the optimal control in the form of an acceleration to be applied by the mobile platform.

The application of the filter makes it possible to minimize the errors in the feeling of the acceleration by the pilot of the simulated vehicle.

Generally a human being is sensitive, when subjected to an acceleration, to a force termed the specific force $\vec{f}_{PS}$. The specific force $\vec{f}_{PS}$ can be defined for the pilot of the simulated vehicle by taking the pilot's head as point of application of the specific force $\vec{f}_{PS}$. The specific force can be defined by the following formula:

$$\vec{f}_{PS} = \vec{a}_{PS} - \vec{g} \tag{1003}$$

where $\vec{a}_{PS}$ denotes the acceleration at the level of the pilot's head, and $\vec{g}$ represents the gravitational force.

The acceleration $\vec{a}_{PS}$ can be expressed in the following manner:

$$\vec{a}_{PS} = \vec{a}_S + \ddot{\vec{R}} + 2\vec{\omega}_S \wedge \dot{\vec{R}} + \vec{\omega}_S \wedge \vec{R} + \vec{\omega}_S \wedge (\vec{\omega}_S \wedge \vec{R}) \tag{1004}$$

by taking:
- $\vec{a}_S$: acceleration applied to the mobile platform of the simulator;
- $\vec{\omega}_S$: the angular velocity of the platform;
- $\vec{R}$: the vector between the center of gravity of the platform and the center of gravity of the pilot.

In expression (1004), it may be considered that:
- $\vec{\omega}_S \wedge (\vec{\omega}_S \wedge \vec{R})$ is negligible;
- $\dot{\vec{\omega}}_S \wedge \dot{\vec{R}}$ and $\ddot{\vec{R}}$ are zero since the distance between the pilot's head and the center of gravity of the simulator is considered to be fixed.

By putting $$\dot{\vec{\omega}}_S = \begin{pmatrix} \dot{\varphi} \\ \dot{\theta} \\ \dot{\psi} \end{pmatrix} \text{ and } \vec{R} = \begin{pmatrix} R_X \\ R_Y \\ R_Z \end{pmatrix},$$

we obtain:

$$\dot{\vec{\omega}}_S \wedge \vec{R} = \begin{pmatrix} R_Z \cdot \dot{\theta} - R_Y \cdot \dot{\psi} \\ R_X \cdot \dot{\psi} - R_Z \cdot \dot{\varphi} \\ R_Y \cdot \dot{\varphi} - R_X \cdot \dot{\theta} \end{pmatrix} \tag{1005}$$

And therefore:

$$\vec{a}_{PS} = \begin{pmatrix} a_X + R_Z \cdot \dot{\theta} - R_Y \cdot \dot{\psi} \\ a_Y + R_X \cdot \dot{\psi} - R_Z \cdot \dot{\varphi} \\ a_Z + R_Y \cdot \dot{\varphi} - R_X \cdot \dot{\theta} \end{pmatrix} \tag{1006}$$

$\vec{g}$ can thereafter be expressed in the reference frame of the simulator by using a matrix $T_{mob\text{-}fix}$ for passing between the terrestrial relative reference frame and the mobile reference frame of the simulator:

$$T_{mob\text{-}fix} = \begin{pmatrix} \cos\theta \cdot \cos\psi & \cos\theta \cdot \sin\psi & -\sin\theta \\ \sin\varphi \cdot \sin\theta \cdot \cos\psi - \cos\varphi \cdot \sin\psi & \sin\varphi \cdot \sin\theta \cdot \sin\psi + \cos\varphi \cdot \cos\psi & \sin\varphi \cdot \cos\theta \\ \cos\varphi \cdot \sin\theta \cdot \cos\psi + \sin\varphi \cdot \sin\psi & \cos\varphi \cdot \sin\theta \cdot \sin\psi - \sin\varphi \cdot \cos\psi & \cos\varphi \cdot \cos\theta \end{pmatrix} \tag{1007}$$

We then obtain:

$$[T_{mob\text{-}fix}] \cdot \begin{pmatrix} 0 \\ 0 \\ g \end{pmatrix} = \begin{pmatrix} -g \cdot \sin\theta \\ g \cdot \sin\varphi \cdot \cos\theta \\ g \cdot \cos\varphi \cdot \cos\theta \end{pmatrix} \tag{1008}$$

The specific force can therefore be expressed thus:

$$\vec{f}_{PS} = \vec{a}_{PS} - \vec{g} = \begin{pmatrix} a_X + R_Z \cdot \dot{\theta} - R_Y \cdot \dot{\psi} + g \cdot \sin\theta \\ a_Y + R_X \cdot \dot{\psi} - R_Z \cdot \dot{\varphi} - g \cdot \sin\varphi \cdot \cos\theta \\ a_Z + R_Y \cdot \dot{\varphi} - R_X \cdot \dot{\theta} - g \cdot \cos\varphi \cdot \cos\theta \end{pmatrix} \tag{1009}$$

Among the systems available to a human being for ensuring his balance and his mobility is the vestibular system. The vestibular system is one of the main sensory systems for perceiving a movement and an orientation with respect to the vertical. Sensory receptors of the vestibular system are situated in the inner ear. The vestibular system makes it possible notably to evaluate a rate of displacement on the basis of an acceleration measured at the level of the inner ear of a human being. Indeed, the inner ear behaves like an instrument for measuring:

angular accelerations, by way of semi-circular canals;

linear accelerations, by way of otoliths.

A modeling of the vestibular system makes it possible to represent sensations felt by a pilot to whom an acceleration is applied as a function of the acceleration applied. For example, it is possible to use models described by R. Telban, W. Wu, F. Cardullo in "Motion Cueing Algorithm Development: Initial investigation and redesign of the algorithms. State university of New York at Binghampton, NASA/CR-2000-209863, March 2005".

A model of semi-circular canals can notably be described by the following relation:

$$\frac{\hat{\omega}}{\omega} = H_{SSC}(s) = \frac{\tau_L \tau_a s^2}{(1+\tau_a s)(1+\tau_S s)(1+\tau_L s)} \quad (1010)$$

and a model of otoliths can be described by the relation:

$$\frac{\hat{f}}{f} = H_{OTO}(s) = \frac{K(1+\tau_a s)}{(1+\tau_L s)(1+\tau_S s)} \quad (1011)$$

with:

$\hat{\omega}$: an angular velocity felt;

$\omega$: a "real" angular velocity;

$\hat{f}$: a specific force felt;

$f$: "real" specific force;

$\tau_S$, $\tau_L$, $\tau_a$, K: time constants dependent on a degree of freedom involved and corresponding to the reaction times of the vestibular system.

On the basis of the models of the vestibular system (1010), (1011), it is possible to construct a global model of feeling of the acceleration by a pilot of the simulated vehicle moved by the mobile platform.

Several models of feeling can be constructed, the model described below is given by way of example.

Initially, it is possible to consider a global model of feeling in two dimensions, one dimension being along a first horizontal axis x and another dimension being along a second horizontal axis y for example. The acceleration $U_{ak}$ calculated by the simulation software can be expressed thus:

$$U_{ak} = \underline{u} = \begin{pmatrix} u_1 \\ u_2 \end{pmatrix} = \begin{pmatrix} \omega_y \\ a_x \end{pmatrix} = \begin{pmatrix} \ddot{\theta} \\ a_x \end{pmatrix} \quad (1012)$$

In two dimensions, the otolith model (1011) becomes for example:

$$\frac{\hat{f}}{f} = H_{OTO}(p) = G_0 \cdot \frac{p+A_0}{(p+B_0)(p+B_1)} \quad (1013)$$

with $f_x = a_x + R_z \cdot \ddot{\theta} g \sin(\theta) = f$ (1014), where $G_0$, $A_0$, $B_0$, $B_1$ are constants.

By considering that: $\sin(\theta) = \theta$ expression (1013) becomes:

$$\hat{f} = G_0 \cdot \frac{p+A_0}{(p+B_0)(p+B_1)} \cdot \left[\left(R_z + g \cdot \frac{1}{p^2}\right) \cdot u_1 + u_2\right] \quad (1014)$$

Expression (1014) can then be put into the following form:

$$\begin{cases} \hat{f} = \hat{f}_1 + \hat{f}_2 \\ \hat{f}_1 = \frac{G_0 \cdot R_z \cdot p^3 + G_0 \cdot A_0 \cdot R_z \cdot p^2 + G_0 \cdot g \cdot p + G_0 \cdot A_0 \cdot g}{p^4 + (B_0+B_1) \cdot p^3 + B_0 \cdot B_1 \cdot p^2} \cdot u_1 \\ \hat{f}_2 = \frac{G_0 \cdot p + G_0 \cdot A_0}{p^2 + (B_0+B_1) \cdot p + B_0 \cdot B_1} \cdot u_2 \end{cases} \quad (1015)$$

In order to obtain a state representation of $\hat{f}_1$, we put:

$$x = \begin{pmatrix} x_1 \\ x_2 \\ x_3 \\ x_4 \end{pmatrix}; \dot{x} = \begin{pmatrix} \dot{x}_1 \\ \dot{x}_2 \\ \dot{x}_3 \\ \dot{x}_4 \end{pmatrix}; \quad (1016)$$

$$A_{OTO\_1} = \begin{bmatrix} A & B & 0 & 0 \\ C & 0 & 0 & 0 \\ 0 & D & 0 & 0 \\ 0 & 0 & E & 0 \end{bmatrix}; B_{OTO\_1} = \begin{bmatrix} F \\ 0 \\ 0 \\ 0 \end{bmatrix};$$

$$C_{OTO\_1} = [1\ 1\ 1\ 1]; D_{OTO\_1} = [0];$$

and we seek A, B, C, D, E, F such that:

$$\begin{cases} \dot{x} = A_{OTO\_1} \cdot x + B_{OTO\_1} \cdot u & (1017) \\ \hat{f}_1 = C_{OTO\_1} \cdot x + D_{OTO\_1} \cdot u & (1018) \end{cases}$$

Expression (1018) becomes: $\hat{f}_1 = x_1 + x_2 + x_3 + x_4$ (1019) and expression (1017) becomes:

$$\begin{cases} p \cdot x_1 = A \cdot x_1 + B \cdot x_2 + F \cdot u_1 \\ p \cdot x_2 = C \cdot x_1 \\ p \cdot x_3 = D \cdot x_2 \\ p \cdot x_4 = E \cdot x_3 \end{cases} \quad (1020)$$

Solving the system (118) gives:

$$x_1 = \frac{F \cdot p}{p^2 - A \cdot p + B \cdot C} \cdot u_1 \quad (1021)$$

$$x_2 = \frac{C \cdot F}{p^2 - A \cdot p + B \cdot C} \cdot u_1 \quad (1022)$$

$$x_3 = \frac{D \cdot C \cdot F}{p \cdot (p^2 - A \cdot p + B \cdot C)} \cdot u_1 \quad (1023)$$

$$x_4 = \frac{E \cdot D \cdot C \cdot F}{p^2 \cdot (p^2 - A \cdot p + B \cdot C)} \cdot u_1 \quad (1024)$$

Then, expression (1019) gives:

$$\hat{f}_1 = \frac{\begin{array}{c}G_0 \cdot R_Z \cdot p^3 + G_0 \cdot A_0 \cdot R_Z \cdot \\ p^2 + G_0 \cdot g \cdot p + G_0 \cdot A_0 \cdot g\end{array}}{p^4 + (B_0 + B_1) \cdot p^3 + B_0 \cdot B_1 \cdot p^2} \tag{1025'}$$

$$= \frac{F \cdot p^3 + C \cdot F \cdot p^2 + D \cdot C \cdot F \cdot p + E \cdot D \cdot C \cdot F}{p^4 + A \cdot p^3 + B \cdot C \cdot p^2} \cdot u_1$$

$$(1025') \Rightarrow \begin{cases} A = -(B_0 + B_1) \\ B = -\dfrac{B_0 \cdot B_1}{A_0} \\ C = A_0 \\ D = \dfrac{g}{A_0 \cdot R_Z} \\ E = A_0 \\ F = G_0 \cdot R_Z \end{cases} \tag{1025}$$

Hence:

$$A_{OTO\_1} = \begin{bmatrix} -(B_0 + B_1) & -\dfrac{B_0 - B_1}{A_0} & 0 & 0 \\ A_0 & 0 & 0 & 0 \\ 0 & \dfrac{g}{A_0 \cdot R_Z} & 0 & 0 \\ 0 & 0 & A_0 & 0 \end{bmatrix}; \tag{1026}$$

$$B_{OTO\_1} = \begin{bmatrix} G_0 \cdot R_Z \\ 0 \\ 0 \\ 0 \end{bmatrix};$$

$$C_{OTO\_1} = [1\ 1\ 1\ 1];$$

$$D_{OTO\_1} = [0]$$

To obtain a state representation of $\hat{f}_2$, we put:

$$x = \begin{pmatrix} x_1 \\ x_2 \end{pmatrix}; \dot{x} = \begin{pmatrix} \dot{x}_1 \\ \dot{x}_2 \end{pmatrix}; u = u_2; \tag{1027}$$

$$A_{OTO\_2} = \begin{bmatrix} A & B \\ C & D \end{bmatrix}; B_{OTO\_2} = \begin{bmatrix} E \\ F \end{bmatrix};$$

$$C_{OTO\_2} = [0\ 1]; D_{OTO\_2} = [0]$$

and we seek A, B, C, D, E, F such that:

$$\begin{cases} \dot{x} = A_{OTO\_2} \cdot x + B_{OTO\_2} \cdot u \\ \hat{f}_1 = C_{OTO\_2} \cdot x + D_{OTO\_2} \cdot u \end{cases} \tag{1028}$$
$$\tag{1029}$$

Expression (129) then gives: $\hat{f}_2 = x_2$ (1030) and expression (1028) gives:

$$\begin{cases} p \cdot x_1 = A \cdot x_1 + B \cdot x_2 + E \cdot u_2 \\ p \cdot x_2 = C \cdot x_1 + D \cdot x_2 + F \cdot u_2 \end{cases} \tag{1031}$$

Solving the system of equations (1031), we obtain:

$$\hat{f}_2 = \frac{G_0 \cdot p + G_0 \cdot A_0}{p^2 + (B_0 + B_1) \cdot p + B_0 \cdot B_1} \cdot u_2 \tag{1025'}$$

$$= \frac{F \cdot p + C \cdot E - A \cdot F}{p^2 - (A + D) \cdot p + D \cdot A - C \cdot B} \cdot u_2 \Rightarrow \begin{cases} F = G_0 \\ C \cdot E - A \cdot F = G_0 \cdot A_0 \\ A + D = -(B_0 + B_1) \\ D \cdot A - C \cdot B = B_0 \cdot B_1 \end{cases} \tag{1032}$$

Arbitrarily fixing two parameters, we obtain:

$$\begin{cases} A = 1 \text{(prescribed)} \\ B = (B_0 + B_1 + 1) - B_0 \cdot B_1 \\ C = 1 \text{ (prescribed)} \\ \phantom{C = 1} \text{ (impose)} \\ D = -(B_0 + B_1 + 1) \\ E = G_0 \cdot (A_0 + 1) \\ F = G_0 \end{cases} \Leftrightarrow \begin{cases} A_{OTO\_2} = \begin{bmatrix} 1 & -(B_0 + B_1 + 1) - B_0 \cdot B_1 \\ 1 & -(B_0 + B_1 + 1) \end{bmatrix} \\ B_{OTO\_2} = \begin{bmatrix} G_0 \cdot (A_0 + 1) \\ G_0 \end{bmatrix} \\ C_{OTO\_2} = [0\ 1] \\ D_{OTO\_2} = [0] \end{cases} \tag{1033}$$

Finally, the state representation of $\hat{f}$ is deduced from the expression $$\hat{f} = \hat{f}_1 + \hat{f}_2.$$

The matrices relating to $\hat{f}$ are:

$$A_{OTO} = \begin{bmatrix} A_{OTO\_1} & 0 \\ 0 & A_{OTO\_2} \end{bmatrix} \tag{1034}$$

$$B_{OTO} = \begin{bmatrix} B_{OTO\_1} & 0 \\ 0 & B_{OTO\_2} \end{bmatrix}$$

$$C_{OTO} = [C_{OTO\_1}\ C_{OTO\_2}]$$

$$D_{OTO} = [D_{OTO\_1}\ D_{OTO\_2}],$$

with:

$$A_{OTO} = \begin{bmatrix} -(B_0 + B_1) & -\dfrac{B_0 \cdot B_1}{A_0} & 0 & 0 & 0 & 0 \\ A_0 & 0 & 0 & 0 & 0 & 0 \\ 0 & \dfrac{g}{A_0 \cdot R_Z} & 0 & 0 & 0 & 0 \\ 0 & 0 & A_0 & 0 & 0 & 0 \\ 0 & 0 & 0 & 0 & 1 & -(B_0 + B_1 + 1) - B_0 \cdot B_1 \\ 0 & 0 & 0 & 0 & 1 & -(B_0 + B_1 + 1) \end{bmatrix}; \tag{1035}$$

$$B_{OTO} = \begin{bmatrix} R_Z \cdot G_0 & 0 \\ 0 & 0 \\ 0 & 0 \\ 0 & 0 \\ 0 & G_0 \cdot (A_0 + 1) \\ 0 & G_0 \end{bmatrix};$$

$$C_{OTO} = [1\ 1\ 1\ 1\ 0\ 1];$$

$$D_{OTO} = [0\ 0]$$

The set of matrices (1035) is one of the possible state representations for the semi-circular canal model. Other representations can be used notably by modifying the values of the parameters fixed in an arbitrary manner.

In two dimensions, the semi-circular canal model (1010) becomes for example:

$$\hat{\omega} = \frac{p^2 \cdot \tau_L \cdot \tau_A}{(1 + \tau_L \cdot p)(1 + \tau_S \cdot p)(1 + \tau_A \cdot p)} \omega \quad (1036)$$

Knowing that $$\underline{u} = \begin{pmatrix} u_1 \\ u_2 \end{pmatrix} = \begin{pmatrix} \omega_y \\ a_x \end{pmatrix} = \begin{pmatrix} \dot{\theta} \\ a_x \end{pmatrix} \quad (1012)$$

and that $\dot{\omega}_y = p \cdot \omega_y$ (1037) then expression (1036) becomes:

$$\hat{\omega} = \frac{p \cdot \tau_L \cdot \tau_A}{(1 + \tau_L \cdot p)(1 + \tau_S \cdot p)(1 + \tau_A \cdot p)} u_1 \quad (1038)$$

Next we seek to express expression (1038) in the following manner:

$$\begin{cases} \underline{\dot{x}} = A_{SCC} \cdot \underline{x} + B_{SCC} \cdot \underline{u} \\ \hat{\omega} = C_{SCC} \cdot x + D_{SCC} \cdot \underline{u} \end{cases} \quad (1039)$$

Expanding expression (1038), we obtain the following expression:

$$\hat{\omega} = \frac{p \cdot \tau_L \cdot \tau_A}{p^3 \cdot \tau_L \cdot \tau_A \cdot \tau_S + p^2 \cdot (\tau_L \cdot \tau_A + \tau_L \cdot \tau_S + \tau_A \cdot \tau_S) + p \cdot (\tau_A + \tau_L + \tau_S) + 1} \cdot u_1 \quad (1040)$$

Next, we put:

$$\left. \begin{array}{l} x = \begin{pmatrix} x_1 \\ x_2 \\ x_3 \end{pmatrix}; \dot{x} = \begin{pmatrix} \dot{x}_1 \\ \dot{x}_2 \\ \dot{x}_3 \end{pmatrix}; u = \begin{pmatrix} u_1 \\ u_2 \end{pmatrix}; A_{SCC} = \begin{bmatrix} A & B & C \\ D & 0 & 0 \\ 0 & E & 0 \end{bmatrix}; \\ B_{SCC} = \begin{bmatrix} F & 0 \\ 0 & 0 \\ 0 & 0 \end{bmatrix}; C_{SCC} = [0\ 1\ 0]; D_{SCC} = [0\ 0] \end{array} \right\} \quad (1041)$$

and we seek A, B, C, D, E, F such that:

$$\begin{cases} \dot{x} = A_{SCC} \cdot x + B_{SCC} \cdot u & (142) \\ \hat{\omega} = C_{SCC} \cdot x + D_{SCC} \cdot u & (143) \end{cases}$$

Equation (1043) gives: $\hat{\omega} = x_2$ (1044) and equation (1042) gives:

$$\begin{cases} p \cdot x_1 = A \cdot x_1 + B \cdot x_2 + C \cdot x_3 + F \cdot u_1 \\ p \cdot x_2 = D \cdot x_1 \\ p \cdot x_3 = E \cdot x_2 \end{cases} \quad (1044)$$

Solving the system (1044), we obtain:

$$\begin{vmatrix} \hat{\omega} = \dfrac{p \cdot \tau_L \cdot \tau_A}{\begin{array}{l} p^3 \cdot \tau_L \cdot \tau_A \cdot \tau_S + p^2 \cdot \\ (\tau_L \cdot \tau_A + \tau_L \cdot \tau_S + \tau_A \cdot \tau_S) + \\ p \cdot (\tau_A + \tau_L + \tau_S) + 1 \end{array}} \cdot u_1 \\ = \dfrac{D \cdot F \cdot p}{p^3 - A \cdot p^2 - D \cdot B \cdot p - D \cdot C \cdot E} \cdot u_2 \\ = \dfrac{-\dfrac{F}{C \cdot E} \cdot p}{-\dfrac{1}{D \cdot C \cdot C} p^3 + \dfrac{A}{D \cdot C \cdot E} \cdot p^2 + \dfrac{B}{C \cdot E} \cdot p + 1} \cdot u_2 \end{vmatrix} \quad (1045)$$

and then:

$$(1045) \Rightarrow \begin{cases} -\dfrac{F}{C \cdot E} = \tau_L \cdot \tau_A \\ -\dfrac{1}{D \cdot C \cdot E} = \tau_L \cdot \tau_A \cdot \tau_S \\ \dfrac{A}{D \cdot C \cdot E} = \tau_L \cdot \tau_A + \tau_L \cdot \tau_S + \tau_A \cdot \tau_S \\ \dfrac{B}{C \cdot E} = \tau_A + \tau_L + \tau_S \end{cases} \quad (1046)$$

Next we arbitrarily fix two of the variables A, B, C, D, E, F in order to solve the system (1046), thus obtaining, for example:

$$\begin{cases} A = -\dfrac{\tau_L \cdot \tau_A + \tau_L \cdot \tau_S + \tau_A \cdot \tau_S}{\tau_L \cdot \tau_A \cdot \tau_S} \\ B = -\dfrac{(\tau_A + \tau_L + \tau_S)}{\tau_L \cdot \tau_A} \\ C = -\dfrac{1}{\tau_L \cdot \tau_A} \\ D = \dfrac{1}{\tau_S} \\ E = 1 \\ F = 1 \end{cases} \quad (1047)$$

and then:

$$\left. \begin{array}{l} A_{CSS} = \begin{bmatrix} -\dfrac{\tau_L \cdot \tau_A + \tau_L \cdot \tau_S + \tau_A \cdot \tau_S}{\tau_L \cdot \tau_A \cdot \tau_S} & -\dfrac{(\tau_A + \tau_L + \tau_S)}{\tau_L \cdot \tau_A} & -\dfrac{1}{\tau_L \cdot \tau_A} \\ \dfrac{1}{\tau_S} & 0 & 0 \\ 0 & 1 & 0 \end{bmatrix} \\ B_{CSS} = \begin{bmatrix} 1 & 0 \\ 0 & 0 \\ 0 & 0 \end{bmatrix} \\ C_{CSS} = [0\ 1\ 0] \\ D_{CSS} = [0] \end{array} \right\} \quad (1048)$$

The matrix set (1048) is one of the possible state representations for the semi-circular canal model. Other representations can be obtained by modifying the values of the parameters ascribed in an arbitrary manner.

Grouping together the state representations of the semi-circular canal and otolith models, we obtain for example:

$$A_V = \begin{pmatrix} A_{SCC} & 0 \\ 0 & A_{OTO} \end{pmatrix}; \quad B_V = \begin{pmatrix} B_{SCC} \\ B_{OTO} \end{pmatrix}; \quad (1049)$$

-continued $$C_V = \begin{pmatrix} C_{SCC} & 0 \\ 0 & C_{OTO} \end{pmatrix}; \quad D_V = \begin{pmatrix} D_{SCC} \\ D_{OTO} \end{pmatrix}$$

A representation of the global system incorporating the feeling of linear and angular accelerations by the pilot can thus take the form:

$$\begin{cases} \dot{x} = A_V \cdot x + B_V \cdot \underline{u} \\ \hat{\underline{y}} = C_V \cdot \underline{x} + D_V \cdot \underline{u} \end{cases} \quad \text{avec} \quad \underline{y}^{feeling} = \begin{pmatrix} \hat{\omega}_{ressenti} \\ \hat{f}_{ressenti} \end{pmatrix} \quad (1050)$$

Once the representation of the global system has been determined, the optimal control is determined by choosing and minimizing a constraining criterion:
  an error e of sensation of the pilot of the simulated vehicle with respect to the sensations of a real vehicle pilot;
  an error $x_e$ in the displacement of the mobile platform.
Initially, two errors to be minimized are therefore constructed:

$$\begin{cases} \underline{x}_e = x_A - x_S \\ e = y_A - y_S \end{cases} \quad (1051)$$

The representation of the global feeling system (1050) then becomes:

$$\begin{cases} \underline{\dot{x}}_e = \underline{\dot{x}}_A - \underline{\dot{x}}_S = A_V \cdot \underline{x}_A + B_V \cdot \underline{u}_A - (A_V \cdot \underline{x}_S + B_V \cdot \underline{u}_S) \\ \underline{e} = C_V \cdot \underline{x}_A + D_V \cdot \underline{u}_A - C_V \cdot \underline{x}_S - D_V \cdot \underline{u}_S \end{cases} \quad (1052)$$

$$\Leftrightarrow \begin{cases} \underline{\dot{x}}_e = A_V \cdot (\underline{x}_A - \underline{x}_S) + B_V (\underline{u}_A - \underline{u}_S) \\ \underline{e} = C_V \cdot (\underline{x}_A - \underline{x}_S) + D_V (\underline{u}_A - \underline{u}_S) \end{cases}$$

and then:

$$\begin{cases} \underline{\dot{x}}_e = A_V \cdot \underline{x}_e + B_V \cdot (\underline{u}_A - \underline{u}_S) \\ \underline{e} = C_V \cdot \underline{x}_e + D_V \cdot (\underline{u}_A - \underline{u}_S) \end{cases} \quad (1053)$$

An additional group of terms, namely the speed and the position of the centroid of the mobile platform, is then introduced: $x_d = {}^1(\dot{x}_s \ x_s)$ (1054)
The following state representation is thus obtained:

$$\begin{cases} x_d = \begin{pmatrix} 0 & 0 \\ 1 & 0 \end{pmatrix} x_d + \begin{pmatrix} 0 & 1 \\ 0 & 0 \end{pmatrix} u_s \\ \underbrace{\phantom{xxx}}_{A_d} \quad \underbrace{\phantom{xxx}}_{B_d} \\ y_d = x_d \end{cases} \quad (1055)$$

Putting $$x = \begin{bmatrix} x_e \\ x_d \end{bmatrix}$$

and $$y = \begin{bmatrix} e \\ y_d \end{bmatrix}$$

and using the system (1055), we obtain:

$$\begin{cases} \dot{x} = \begin{pmatrix} A_v & 0 \\ 0 & A_d \end{pmatrix} x + \begin{pmatrix} B_v \\ 0 \end{pmatrix} u_a + \begin{pmatrix} -B_v \\ B_d \end{pmatrix} u_s \\ y = \begin{pmatrix} C_v & 0 \\ 0 & I \end{pmatrix} x \end{cases} \quad (1056)$$

and:

$$\begin{cases} \dot{x} = A \cdot x + B \cdot u_S + D \cdot u_A \\ y = C \cdot x \end{cases} \quad (1057)$$

with $$A = \begin{pmatrix} A_v & 0 \\ 0 & A_d \end{pmatrix}, \quad D = \begin{pmatrix} B_v \\ 0 \end{pmatrix}, \quad B = \begin{pmatrix} -B_v \\ B_d \end{pmatrix}, \quad C = \begin{pmatrix} C_v & 0 \\ 0 & I \end{pmatrix}$$

The systems of equations (1056) and (1057) therefore define a state representation of the system to be solved in order to minimize the errors (1051).

It is then possible to define a minimization criterion that can, for example, be expressed in the following manner:

$$J = E\left\{ \int_{t0}^{t1} ({}^t\underline{e} \cdot Q_d \cdot \underline{e} + {}^t\underline{x}_d \cdot R_d \cdot \underline{x}_d + {}^t\underline{u}_s \cdot R \cdot \underline{u}_s) dt \right\} \quad (1058)$$

where $Q_d$ and $R_d$ are positive semi-definite matrices and R a positive definite matrix.

The behavior of the real vehicle being unknown and given that in order to apply the procedure for the optimal acceleration control it is necessary to know a trajectory of the system in the state space, it is assumed that the displacement command for the real vehicle is constant between two instants of sampling of the trajectory of the system.

The minimization criterion (1058) can then be written in the following form:

$$J = \frac{1}{2}\left\{ \int_{t0}^{t1} ({}^t\underline{x}_d \cdot R_d \cdot \underline{x}_d + {}^t\underline{u}_s \cdot R \cdot \underline{u}_s) dt \right\} + \frac{1}{2}\left\{ \int_{t0}^{t1} {}^t\underline{e} \cdot Q_d \cdot \underline{e} dt \right\} \quad (1059)$$

Expression (1059) for the minimization criterion comprises:
  a first term $({}^t x_d \cdot R_d \cdot x_d + {}^t u_S \cdot R \cdot u_S)$ corresponding to a minimization of the error in the displacement;
  a second term $\underline{e} \cdot Q_d \cdot \underline{e}$ to a minimization of the sensation error.
The criterion defined by expression (1059) therefore represents a compromise between the minimization of the two errors described by expression (1051).

Grouping the matrices $Q_d$ and $R_d$ into a single matrix Q:

$$Q = \begin{pmatrix} Q_d & 0 \\ 0 & R_d \end{pmatrix} \quad (1060)$$

the expression for the minimization criterion (1059) becomes:

$$J = \frac{1}{2}\left\{\int_{t_0}^{t_1} ({}^t\underline{y} \cdot Q \cdot \underline{y} + {}^t u_s \cdot R \cdot u_s) dt\right\} \quad (1061)$$

with the matrix Q non-negative definite and the matrix R positive definite.

If we choose $t_1$ fairly large, thus corresponding to an infinite horizon, then expression (1061) for the minimization criterion becomes:

$$J = \frac{1}{2}\left\{\int_0^\infty ({}^t\underline{y} \cdot Q\underline{y} + {}^t\underline{u_s} \cdot R \cdot \underline{u_s}) dt\right\} \quad (1062)$$

To solve the system, we use the procedure for the optimal control which amounts to maximizing a Hamiltonian of the system defined by:

$$H = -\frac{1}{2}[{}^t y \cdot Q \cdot y + {}^t u_s \cdot R \cdot u_s] + {}^t\lambda(A \cdot x + D \cdot u_A + B \cdot u_S) \quad (1063)$$

Hamilton's canonical equations are as follows:

$$\begin{vmatrix} \frac{dx}{dt} = H_\lambda \\ \frac{d\lambda}{dt} = -H_x, \end{vmatrix} \quad (1064)$$

with $$\begin{vmatrix} x_{t=0} = 0 \\ \lambda_{t=T} = 0 \end{vmatrix} \quad (1065)$$

The second Hamilton canonical equation $$\frac{d\lambda}{dt} = -H_x$$

gives:

$$\dot{\lambda} = {}^tC \cdot Q \cdot C \cdot x - {}^tA \cdot \lambda \quad (1066)$$

and maximizing the Hamiltonian gives: $u_S = R^{-1} \cdot {}^tB \cdot \lambda$ (1067). Expression (1067) represents the optimal control.

It is then possible to define a system relating x and λ in the following manner:

$$\begin{cases} \dot{x} = A \cdot x + B \cdot R^{-1} \cdot {}^tB \cdot \lambda + D \cdot u_A \\ \dot{\lambda} = {}^tC \cdot Q \cdot C \cdot x - {}^tA \cdot \lambda \end{cases} \quad (1068)$$

This is a case of a pursuit problem since $e = y_A - y_S$ is arbitrary. We can therefore put: $\lambda(t) = K(t) \cdot x(t) + k(t)$ (1069). By considering that e(t) is constant since $u_A$ is constant, we can then consider that when T is very large, K and k are constants, hence:

$$\lambda = Kx + k \quad (1070)$$

The system (1068) then becomes:

$$\begin{cases} \dot{x} = A \cdot x + B \cdot R^{-1} \cdot {}^tB \cdot (K \cdot x + k) + D \cdot u_A \\ K \cdot \dot{x} = {}^tC \cdot Q \cdot C \cdot x - {}^tA \cdot (K \cdot x + k) \end{cases} \quad (1071)$$

Replacing $\dot{x}$ by its value, we then obtain:

$$(K \cdot A + {}^tA \cdot K + K \cdot B \cdot R^{-1} \cdot {}^tB \cdot K - {}^tC \cdot Q \cdot C) \cdot x = -(K \cdot B \cdot R^{-1} \cdot {}^tB \cdot k + K \cdot D \cdot u_A + {}^tA \cdot k), \quad (1072)$$

for all x(t), hence:

$$\begin{cases} K \cdot A + {}^tA \cdot K + K \cdot B \cdot R^{-1} \cdot {}^tB \cdot K - {}^tC \cdot Q \cdot C = 0 \\ K \cdot B \cdot R^{-1} \cdot {}^tB \cdot k + K \cdot D \cdot u_A + {}^tA \cdot k = 0 \end{cases} \quad (1073)$$

Therefore K is a solution of the first equation of the system (1073): $K \cdot A + {}^tA \cdot K + K \cdot B \cdot R^{-1} \cdot {}^tB \cdot K - {}^tC \cdot Q \cdot C = 0$ the so-called Ricatti equation.

k can therefore be written in the following form:

$$k = -(K \cdot B \cdot R^{-1} \cdot {}^tB + {}^tA)^{-1} \cdot K \cdot D \cdot u_A \quad (1074)$$

Let us put: $M = -(K \cdot B \cdot R^{-1} \cdot {}^tB + {}^tA)^{-1} \cdot K \cdot D$ (1075)

We therefore obtain $k = M \cdot u_a$ (1075'), the optimal control is then given by: $u_S = R^{-1} \cdot {}^tB \cdot (K \cdot x + M \cdot u_A)$ (1076)

i.e. according to the expression for M: $u_S = R^{-1} \cdot {}^tB \cdot (K \cdot x + M \cdot u_A)$ (1077)

Substituting the expression for $u_S$ into equation (1071), we obtain a differential equation making it possible to determine an evolution of the state vector x as a function of the input control $u_a$:

$$\begin{cases} \dot{x} = (A + B \cdot R^{-1} \cdot {}^tB \cdot K) \cdot x + (B \cdot R^{-1} \cdot {}^tB \cdot M + D) \cdot u_A \\ 0 = K \cdot A + {}^tA \cdot K + K \cdot B \cdot R^{-1} \cdot {}^tB \cdot K - {}^tC \cdot Q \cdot C \end{cases} \quad (1078)$$

Next we deduce from this an expression for a filter W(s) to be applied to the input control $u_a$ such that: $u_S = W_s \times u_a$ $$W(s) = R^{-1} \cdot {}^tB \cdot K \cdot [s \cdot I - (A + B \cdot R^{-1} \cdot {}^tB \cdot K)]^{-1} \cdot (B \cdot R^{-1} \cdot {}^tB \cdot M + D) + R^{-1} \cdot {}^tB \cdot M \quad (1079)$$

The control $u_s$ represents an optimal acceleration to be provided to the mobile platform so as to ensure a realistic displacement of the platform minimizing the error in sensation felt by the pilot of the simulated vehicle with respect to a pilot of a real vehicle.

It is also possible to consider a model of feeling in three dimensions, for a mobile platform system having six degrees of freedom. In this case, the acceleration used as input can be represented in the following manner:

$$\underline{u} = \begin{pmatrix} u_1 \\ u_2 \\ u_3 \\ u_4 \\ u_5 \\ u_6 \end{pmatrix} = \begin{pmatrix} \dot{\omega}_x \\ \dot{\omega}_y \\ \dot{\omega}_z \\ a_x \\ a_y \\ a_z \end{pmatrix} = \begin{pmatrix} \ddot{\varphi} \\ \ddot{\theta} \\ \ddot{\psi} \\ \ddot{x} \\ \ddot{y} \\ \ddot{z} \end{pmatrix} \quad (1080)$$

The three-dimensional semi-circular canal model is given by the following expression:

$$\frac{\hat{\omega}}{\omega} = H_{SSC}(s) = \frac{\tau_L \tau_a s^2}{(1+\tau_a s)(1+\tau_S s)(1+\tau_L s)} \quad (1010)$$

with:

$\dot{\hat{\omega}} = [\dot{\hat{\phi}} \ \dot{\hat{\theta}} \ \dot{\hat{\psi}}]'$: a felt angular velocity;
$\overline{\dot{\omega}} = [\dot{\Phi} \ \dot{\theta} \ \dot{\psi}]'$: a real angular velocity.

The three-dimensional otolith model is given by the following expression:

$$\frac{\hat{f}}{f} = H_{OTO}(s) = \frac{K(1+\tau_a s)}{(1+\tau_L s)(1+\tau_S s)} \quad (1011)$$

$\hat{f} = [\hat{\ddot{x}} \ \hat{\ddot{y}} \ \hat{\ddot{z}}]'$: a felt specific force;
$\overline{f} = [\ddot{x} \ \ddot{y} \ \ddot{z}]'$: "real" specific force.

By considering the six degrees of freedom, the specific force may be written in a reference frame tied to the base of the simulator:

$$f_P = \begin{pmatrix} a_X + R_Z \cdot \ddot{\theta} - R_Y \cdot \ddot{\psi} + g \cdot \sin\theta \\ a_Y + R_X \cdot \ddot{\psi} - R_Z \cdot \ddot{\varphi} - g \cdot \sin\varphi \cdot \cos\theta \\ a_Z + R_Y \cdot \ddot{\varphi} - R_X \cdot \ddot{\theta} - g \cdot \cos\varphi \cdot \cos\theta \end{pmatrix} \quad (1081)$$

Within the framework of an approximation for small angles and assuming that the pilot is vertically in line with the centroid of the mobile platform, that is to say $R_X = R_Y = 0$, the specific force may then be written:

$$f_P = \begin{pmatrix} a_X + R_Z \cdot \ddot{\theta} + g \cdot \theta \\ a_Y - R_Z \cdot \ddot{\varphi} - g \cdot \varphi \\ a_Z - g \end{pmatrix} \quad (1082)$$

We can define $u_s$ as a given comprising accelerations at the level of the centroid of the mobile platform:

$$u_s = [\dot{\omega}_x \ \dot{\omega}_y \ \dot{\omega}_z \ a_x \ a_y \ a_z]' = [u(1) u(2) u(3) u(4) u(5) u(6)]' \quad (1083)$$

We can thus express $f_P$ as a function of $u_s$:

$$f_P = \begin{pmatrix} u(4) + \left(R_Z + \frac{1}{p^2}g\right) \cdot u(2) \\ u(5) - \left(R_Z + \frac{1}{p^2}g\right) \cdot u(1) \\ u(6) - g \end{pmatrix} \quad (1084)$$

In the expression obtained (1084) the specific forces $f_P$ are decoupled along the three axes. Indeed, if we write:

$$f_P = [f_{px}, f_{py}, f_{pz}], u_1 = [\ddot{\theta}\ddot{x}]', u_2 = [\ddot{\varphi}\ddot{y}]', u_3 = [\ddot{\psi}\ddot{z}]' \quad (1085)$$

Then, we have: $f_{px} = f(u_1)$, $f_{py} = f(u_2)$, $f_{pz} = f(u_3)$. It is therefore possible to apply the solution procedure for the optimal control used in the two-dimensional case for the specific forces along the x and y axes. For the specific force along the z axis, it is possible for example to use a simple reproduction of the accelerations.

We consider a state system such as constructed previously:

$$\begin{cases} \dot{x} = A \cdot x + B \cdot u_s + D \cdot u_a \\ y = C \cdot x \end{cases} \quad (1086)$$

The system (1086) must then be discretized to obtain a discrete-time acceleration control filter. Obtaining a discrete-time filter makes it possible to forecast the instant at which the physical limits of the platform will be attained. The discretized system (1086) then becomes:

$$\begin{cases} x_{k+1} = A_1 \cdot x_k + B_1 \cdot u_{sk} + D_1 \cdot u_{ak} \\ y_k = C \cdot x_k \end{cases} \quad (1087)$$

With:
$T_e$ a small discretization time-step;
$A_1 = e^{A \cdot T_e}$,
$B_1 = T_e \cdot e^{A \cdot T_e} \cdot B$,
$D_1 = T_e \cdot e^{A \cdot T_e} \cdot D$.

If k is a time-step number, the criterion to be minimized, becomes in the three-dimensional case:

$$J = \frac{1}{2} \sum_{k=0}^{N-1} {}^t x_k C^T \cdot Q \cdot C x_k + {}^t u_{sk} \cdot R \cdot u_{sk} \quad (1088)$$

The Hamiltonian associated with the minimization criterion (1088) is given by the expression:

$$H = -\frac{1}{2} \cdot \sum_{k=0}^{N-1} {}^t x_k \cdot {}^t C \cdot Q \cdot C \cdot x_k + {}^t u_{sk} \cdot R \cdot u_{sk} + \sum_{k=0}^{N-1} {}^t \lambda_{k+1} \cdot \\ (A_1 \cdot x_k + B_1 \cdot u_{sk} + D_1 \cdot u_{ak}) \quad (1089)$$

The canonical equations corresponding to the expression for the Hamiltonian (1089) are as follows:

$$\begin{cases} x_{k+1} = H_{\lambda_{k+1}} \\ \lambda_k = H_{x_k} \end{cases} \quad (1090)$$

Maximization of the Hamiltonian therefore gives:

$$-R \cdot u_{sk} + B_1^T \cdot \lambda_{k+1} = 0 \Leftrightarrow u_{sk} = R^{-1} \cdot B_1^T \cdot \lambda_{k+1} \quad (1090)$$

The system relating x and λ is then:

$$\begin{cases} x_{k+1} = A_1 \cdot x_k + B_1 \cdot R^{-1} \cdot {}^t B_1 \cdot \lambda_{k+1} + D_1 \cdot u_{ak} \\ \lambda_k = -{}^t C \cdot Q \cdot C \cdot x_k + {}^t A_1 \cdot \lambda_{k+1} \end{cases} \quad (1092)$$

If N is assumed to be large, in a stationary case with infinite horizon, we therefore have:

$$\lambda_k = K \cdot x_k + k \forall k \geq 1 \quad (1093)$$

The system (1092) then becomes:

$$\begin{cases} 0 = ({}^tC \cdot Q \cdot C + K) \cdot x_k - {}^tA_1 \cdot K \cdot x_{k+1} + (I - {}^tA_1) \cdot k \\ x_{k+1} = (I - B_1 \cdot R^{-1} \cdot {}^tB_1 \cdot K)^{-1} \cdot (D_1 \cdot u_{ak} + B_1 \cdot R^{-1} \cdot {}^tB_1 \cdot k + A_1 \cdot x_k) \end{cases} \quad (1094)$$

By substitution, we obtain the following equation:

$$[({}^tC \cdot Q \cdot C + K) - {}^tA_1 \cdot K \cdot (I - B_1 \cdot R^{-1} \cdot {}^tB_1 \cdot K)^{-1} \cdot A_1] \cdot x_k - [{}^tA_1 \cdot K \cdot (I - B_1 \cdot R^{-1} \cdot {}^tB_1 \cdot K)^{-1} \cdot (D_1 \cdot u_{ak} + B_1 \cdot R^{-1} \cdot {}^tB_1 \cdot k) - (I - {}^tA_1) \cdot k] = 0 \quad (1095)$$

Equation (1095) being true $\forall x_k$, the system (1096) described in the Annex is therefore obtained.

Using the following lemma: $(A - BCD)^{-1} = A^{-1} + A^{-1} \cdot B \cdot (C^{-1} - DA^{-1}B)^{-1} DA^{-1}$ on the first equation of the system (1096), said equation then becomes:

$$({}^tC \cdot Q \cdot C + K) - {}^tA_1 \cdot K \cdot (I - B_1 \cdot R^{-1} \cdot {}^tB_1 \cdot K)^{-1} \cdot A_1 = 0 \quad (1097)$$

And then:

$${}^tC \cdot Q \cdot C + K - {}^tA_1 \cdot K \cdot A_1 - {}^tA_1 \cdot K \cdot B_1 (R - {}^tB_1 \cdot K \cdot B_1)^{-1} \cdot {}^tB_1 \cdot K \cdot A_1 = 0 \quad (1098)$$

Expression (1098) being a discrete-time Ricatti equation.
The second equation of the system (1096) becomes the system (1099):

$$\begin{aligned} k &= \left(I - {}^tA_1 - {}^tA_1 \cdot K \cdot (I - B_1 \cdot R^{-1} \cdot {}^tB_1 \cdot K)^{-1} \cdot B_1 \cdot R^{-1} \cdot {}^tB_1\right)^{-1} \cdot \\ &\quad ({}^tA_1 \cdot K \cdot (I - B_1 \cdot R^{-1} \cdot {}^tB_1 \cdot K)^{-1} \cdot D_1) \cdot u_{ak} \end{aligned} \quad (1099)$$

Putting $$\begin{aligned} N_D &= I - {}^tA_1 - {}^tA_1 \cdot K \cdot (I - B_1 \cdot R^{-1} \cdot {}^tB_1 \cdot K)^{-1} \cdot B_1 \cdot R^{-1} \cdot {}^tB_1\bigr)^{-1} \cdot \\ &\quad ({}^tA_1 \cdot K \cdot (I - B_1 \cdot R^{-1} \cdot {}^tB_1 \cdot K)^{-1} \cdot D_1 \end{aligned} \quad (1100)$$

Expression (1099) can then be expressed in the following form:

$$\begin{cases} k = N_D \cdot u_{ak} \\ N_D = I - {}^tA_1 - {}^tA_1 \cdot K \cdot (I - B_1 \cdot R^{-1} \cdot {}^tB_1 \cdot K)^{-1} \cdot B_1 \cdot R^{-1} \cdot {}^tB_1)^{-1} \cdot \\ \quad ({}^tA_1 \cdot K \cdot (I - B_1 \cdot R^{-1} \cdot {}^tB_1 \cdot K)^{-1} \cdot D_1 \end{cases} \quad (1101)$$

We therefore obtain the following relation:

$$\begin{cases} x_{k+1} = A_1 \cdot x_k + B_1 \cdot u_{sk} + D_1 \cdot u_{ak} \\ u_{sk} = R^{-1} \cdot {}^tB_1 \cdot (K \cdot x_{k+1} + k) \end{cases} \quad (1102)$$

with K satisfying:

$${}^tC \cdot Q \cdot C + K - {}^tA_1 \cdot K \cdot A_1 - {}^tA_1 \cdot K \cdot B_1 (R - {}^tB_1 \cdot K \cdot B_1)^{-1} \cdot {}^tB_1 \cdot K \cdot A_1 = 0$$

$$k = N_D \cdot u_{ak}$$

$$N_D = I - {}^tA_1 - {}^tA_1 \cdot K \cdot (I - B_1 \cdot R^{-1} \cdot {}^tB_1 \cdot K)^{-1} \cdot B_1 \cdot R^{-1} \cdot {}^tB_1)^{-1} \cdot ({}^tA_1 \cdot K \cdot (I - B_1 \cdot R^{-1} \cdot {}^tB_1 \cdot K)^{-1} \cdot D_1 \quad (1103)$$

The system is then solved by substitution and the following form for the optimal control is obtained:

$$x_{k+1} = [A_1 + B_1 \cdot (I - R^{-1} \cdot {}^tB_1 \cdot K \cdot B_1)^{-1} \cdot R^{-1} \cdot {}^tB_1 \cdot K \cdot A_1] \cdot x_k + [B_1 \cdot (I - R^{-1} \cdot {}^tB_1 \cdot K \cdot B_1)^{-1}) \cdot (R^{-1} \cdot {}^tB_1 \cdot (K \cdot D_1 + N)) + D_1] \cdot u_{ak} \quad (1104)$$

The filter to be applied to the input acceleration can therefore have for example the following form:

$$[B_1 \cdot (I - R^{-1} \cdot {}^tB_1 \cdot K \cdot B_1)^{-1} \cdot (R^{-1} \cdot {}^tB_1 \cdot (K \cdot D_1 + N)) + D_1] \quad (1105)$$

Figure 5A:
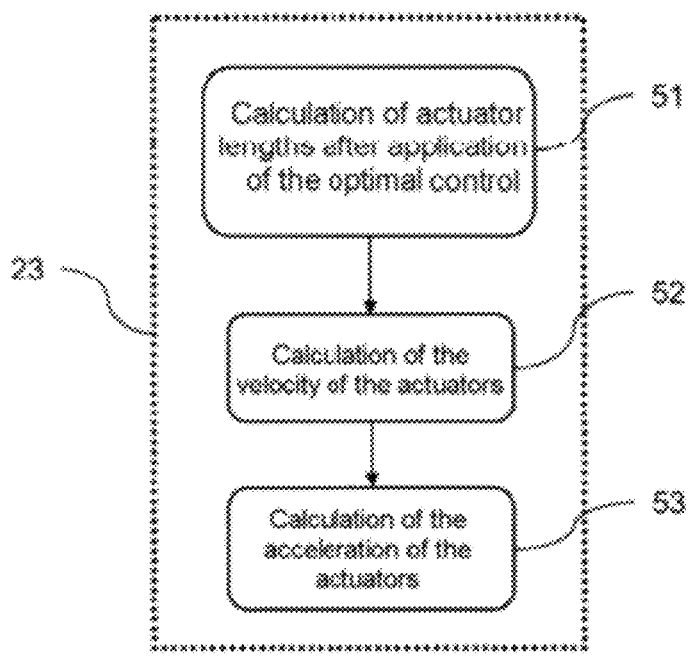
FIG. 5*a*: a schematic of various possible steps of calculating a direct kinematics of the actuators of the mobile simulation platform.

FIG. 5a represents several possible steps 51, 52, 53 for the direct kinematics calculation 23 represented in FIG. 2.

A first step of the direct kinematics calculation 23 is a calculation of the length of the actuators 51 after application of the optimal control calculated in the course of the second step 22 of the control generating method according to the invention. To calculate the actuator extension length required for the application of the optimal control, it is firstly necessary to calculate the coordinates of the various points of attachment of the actuators of the mobile platform. Among the actuator attachment points, first attachment points are situated on a mobile part of the platform.

The platform considered is for example a Stewart platform. The calculations described subsequently are adapted for the example to the case of a Stewart platform.

Figure 5B:
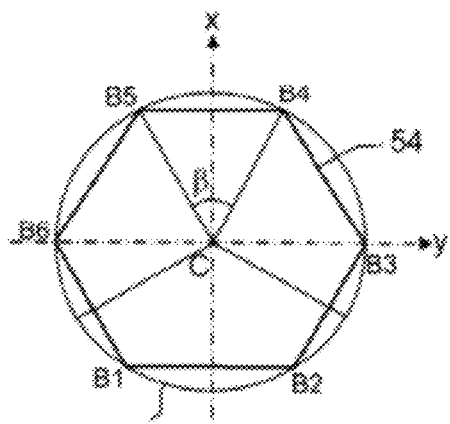
FIG. 5*b*: a schematic representation of a mobile deck of a Stewart platform.

A mobile part or mobile deck 54 of the Stewart platform can be represented, as in FIG. 5b, by a hexagon whose six vertices can be denoted $B_1$, $B_2$, $B_3$, $B_4$, $B_5$, $B_6$. The mobile deck 54 can be centered on a reference frame defined by two perpendicular axes, x, y. The mobile deck is defined such that: $B_4B_5 = B_6B_1 = B_2B_3 = E_1$.

We put:
C the center of the mobile deck and of the reference frame x, y;
$\beta$ the angle between the vectors $\overline{CB_4}$, $\overline{CB_5}$;
$R_1$ the radius of a circle 55 circumscribing the mobile deck 55.

Then $$\beta = 2 \cdot \arctan\left(\frac{E_1}{2 \cdot \sqrt{(R_1)^2 - (E_1/2)^2}}\right) \quad (1106)$$

and $$CB_1 = \begin{pmatrix} -R_1 \cos(\pi/3 - \beta/2) \\ -R_1 \sin(\pi/3 - \beta/2) \end{pmatrix}; \quad (1107)$$

$$CB_2 = \begin{pmatrix} -R_1 \cos(\pi/3 - \beta/2) \\ R_1 \sin(\pi/3 - \beta/2) \end{pmatrix};$$

$$CB_3 = \begin{pmatrix} -R_1 \cos(\pi/3 + \beta/2) \\ R_1 \sin(\pi/3 + \beta/2) \end{pmatrix};$$

$$CB_4 = \begin{pmatrix} R_1 \cos(\beta/2) \\ R_1 \sin(\beta/2) \end{pmatrix};$$

$$CB_5 = \begin{pmatrix} R_1 \cos(\beta/2) \\ -R_1 \sin(\beta/2) \end{pmatrix};$$

$$CB_6 = \begin{pmatrix} -R_1 \cos(\pi/3 + \beta/2) \\ -R_1 \sin(\pi/3 + \beta/2) \end{pmatrix}.$$

Figure 5C:
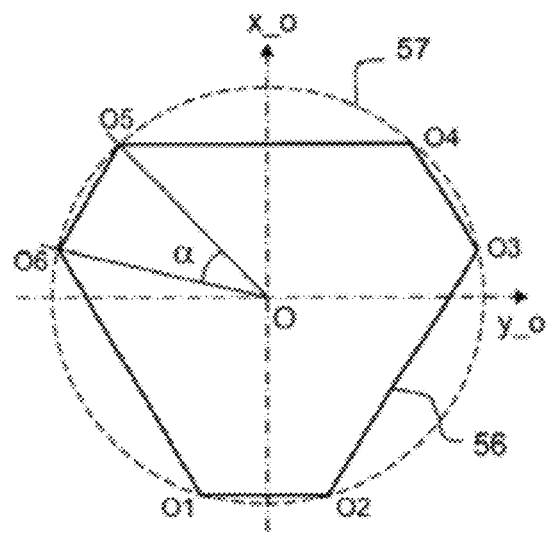
FIG. 5*c*: a schematic representation of a fixed deck of a Stewart platform.

A fixed part or fixed deck 56 of the Stewart platform can be represented, as in FIG. 5c, by a hexagon whose six vertices can be denoted $O_1$, $O_2$, $O_3$, $O_4$, $O_5$, $O_6$. The fixed deck 56 can be centered on a reference frame defined by two perpendicular axes x_o, y_o. The mobile deck is defined such that: $O_1O_2 = O_3O_4 = O_5B_6 = E_2$.

We put:

O the center of the fixed deck and of the reference frame x_o, y_o;

$\alpha$ the angle between the vectors $\overline{OO_5}$, $\overline{OO_6}$;

$R_2$ the radius of a circle 57 circumscribing the fixed deck 56.

Then $$\alpha = 2 \cdot \arctan\left(\frac{E_2}{2 \cdot \sqrt{(R_2)^2 - (E_2/2)^2}}\right) \quad (1108)$$

and $$OB_1 = \begin{pmatrix} R_2\cos(\alpha/2) \\ -R_2\sin(\alpha/2) \end{pmatrix}; \quad (1109)$$

$$OB_2 = \begin{pmatrix} -R_2\cos(\alpha/2) \\ R_2\sin(\alpha/2) \end{pmatrix};$$

$$OB_3 = \begin{pmatrix} R_2\cos(\pi/3 + \alpha/2) \\ R_2\sin(\pi/3 + \alpha/2) \end{pmatrix};$$

$$OB_4 = \begin{pmatrix} R_2\cos(\pi/3 - \alpha/2) \\ R_2\sin(\pi/2 - \alpha/2) \end{pmatrix};$$

$$OB_5 = \begin{pmatrix} R_2\cos(\pi/3 - \alpha/2) \\ -R_2\sin(\pi/3 - \alpha/2) \end{pmatrix};$$

$$OB_6 = \begin{pmatrix} R_2\cos(\pi/3 + \alpha/2) \\ -R_2\sin(\pi/3 + \alpha/2) \end{pmatrix}$$

Expressing the vectors $\overline{O_iB_i}$, i being an integer lying between one and six, in a reference frame tied to the ground, we deduce:

$$\overline{O_iB_i} = -\overline{OO_i} + \overline{OC} + \overline{CB_i}$$

$$= \begin{pmatrix} -xO_i \\ -yO_i \\ 0 \end{pmatrix} + \begin{pmatrix} x_C \\ y_C \\ z_C \end{pmatrix} + [T] \cdot \begin{pmatrix} xB_i \\ yB_i \\ 0 \end{pmatrix}$$

$$= \begin{pmatrix} x_C + \cos\theta \cdot \cos\psi \cdot xB_i + \cos\theta \cdot \sin\psi \cdot yB_i - xO_i \\ y_C + (\sin\varphi \cdot \sin\theta \cdot \cos\psi - \cos\varphi \cdot \sin\psi) \cdot xB_i + (\sin\varphi \cdot \sin\theta \cdot \sin\psi + \cos\varphi \cdot \cos\psi) \cdot yB_i - yO_i \\ z_C + (\cos\varphi \cdot \sin\theta \cdot \cos\psi + \sin\varphi \cdot \sin\psi) \cdot xB_i + (\cos\varphi \cdot \sin\theta \cdot \sin\psi - \sin\varphi \cdot \cos\psi) \cdot yB_i - zO_i \end{pmatrix}$$

recalling that:

$$\begin{bmatrix} X_S \\ Y_S \\ Z_S \end{bmatrix} = [T] \cdot \begin{bmatrix} X_T \\ Y_T \\ Z_T \end{bmatrix}, \quad (1111)$$

with:

$$[T] = \begin{bmatrix} \cos\theta \cdot \cos\psi & \sin\varphi \cdot \sin\theta \cdot \cos\psi - \cos\varphi \cdot \sin\psi & \cos\varphi \cdot \sin\theta \cdot \cos\psi - \sin\varphi \cdot \sin\psi \\ \cos\theta \cdot \sin\psi & \sin\varphi \cdot \sin\theta \cdot \sin\psi - \cos\varphi \cdot \cos\psi & \cos\varphi \cdot \sin\theta \cdot \sin\psi - \sin\varphi \cdot \cos\psi \\ -\sin\theta & \sin\varphi \cdot \cos\theta & \cos\varphi \cdot \cos\theta \end{bmatrix} \quad (1112)$$

and $$l_i = \sqrt{\overline{OB_i} \cdot \overline{OB_i}}, \quad (1113)$$

$l_i$ representing the extension length of each actuator.

A second step of the direct kinematics calculation 23 is a calculation of the velocity of the actuators 52, calculated as a function of the actuator lengths obtained in the course of the first step 51 of the direct kinematics calculation 23.

We have:

$$l_i^2 = \overline{OB_i} \cdot \overline{OB_i} \quad (1114).$$

by differentiation we obtain:

$$l_i \cdot \frac{dl_i}{dt} = \frac{d\overline{OB_i}}{dt} \cdot \overline{OB_i} \quad (1115)$$

hence:

$$v_i = \frac{dl_i}{dt} \quad (1116)$$

$$= \frac{1}{l_i} \left( \frac{d\overline{OB_i}}{dt} \cdot \overline{OB_i} \right),$$

with $$l_i = \sqrt{\overline{OB_i} \cdot \overline{OB_i}} \quad (1117)$$

and $\overline{O_iB_i}$ such as described in Annex 1 by the expression, (1118) this implies:

$$\left(\frac{d\overline{O_iB_i}}{dt}\right)_x = \dot{x}_C + (xB_i \ yB_i) \cdot \begin{pmatrix} -(\sin\theta \cdot \cos\psi) \cdot \dot\theta - (\cos\theta \cdot \sin\psi) \cdot \dot\psi \\ -(\sin\theta \cdot \sin\psi) \cdot \dot\theta + (\cos\theta \cdot \cos\psi) \cdot \dot\psi \end{pmatrix} \quad (1119)$$

$$\left(\frac{d\overline{O_iB_i}}{dt}\right)_y = \dot{y}_C + (xB_i \ yB_i) \cdot \Upsilon_1 \quad (1120)$$

with $\gamma_1$ defined in Annex 1 by expression (1120')

$$\left(\frac{d\overrightarrow{O_iB_i}}{dt}\right)_z = \dot{z}_C + (xB_i \ yB_i) \cdot \Upsilon_2 \quad (1121)$$

with $\gamma_2$ defined in Annex 1 by expression (1121')

A third step of the direct kinematics calculation 23 is a calculation of the acceleration of the actuators 53, calculated as a function of the velocity of the actuators obtained in the course of the second step 52 of the direct kinematics calculation 23.

We have:

$$l_i \cdot \frac{dl_i}{dt} = \frac{d\overrightarrow{OB_i}}{dt} \cdot \overrightarrow{OB_i} \quad (1122)$$

by differentiation we obtain:

$$l_i \cdot \frac{d^2 l_i}{dt^2} + \left(\frac{dl_i}{dt}\right)^2 = \left(\frac{d\overrightarrow{OB_i}}{dt}\right)^2 + \frac{d^2 \overrightarrow{OB_i}}{dt^2} \cdot \overrightarrow{OB_i} \quad (1123)$$

hence:

$$a_i = \frac{d^2 l_i}{dt^2} = \frac{1}{l_i}\left[\left(\frac{d\overrightarrow{OB_i}}{dt}\right)^2 + \frac{d^2 \overrightarrow{OB_i}}{dt^2} \cdot \overrightarrow{OB_i} - \left(\frac{dl_i}{dt}\right)^2\right] \quad (1124)$$

with:

$$\left(\frac{d^2 \overrightarrow{O_iB_i}}{dt^2}\right)_x = \ddot{x}_C + (xB_i \ yB_i) \cdot \Upsilon_3 \quad (1125)$$

with $\gamma_3$ defined in Annex 1 by expression (1125')

$$\left(\frac{d^2 \overrightarrow{O_iB_i}}{dt^2}\right)_y = \ddot{y}_C + (xB_i \ yB_i) \cdot \Upsilon_4 \quad (1126)$$

with $\gamma_4$ defined in Annex 1 by expression (1126') and with the matrices (1126") defined in Annex 1.

$$\left(\frac{d^2 \overrightarrow{O_iB_i}}{dt^2}\right)_z = \ddot{z}_C + (xB_i \ yB_i) \cdot \Upsilon_5 \quad (1127)$$

with $\gamma_5$ defined in Annex 2 by expression (1127') and with the matrices (1127") defined in Annex 2.

The acceleration $\ddot{l}_i$ can then be put into the following form:

$$\ddot{l}_i = h(\dot{\varphi}, \dot{\theta}, \dot{\psi}, \dot{x}, \dot{y}, \dot{z}) \quad (1128)$$

-continued $$\ddot{l}_i = A_1 \cdot \dot{\varphi} + A_2 \cdot \dot{\theta} + A_3 \cdot \dot{\psi} + A_4 + \ddot{x} + A_5 \cdot \ddot{y} + A_6 \cdot \ddot{z} + ct \quad (1129)$$

with:

$$A_1 = {}^t\begin{pmatrix} 0 \\ B_{yx\varphi} \cdot xB_i + B_{yy\varphi} \cdot yB_i \\ B_{zx\varphi} \cdot xB_i + B_{zy\varphi} \cdot yB_i \end{pmatrix} \cdot \frac{\overrightarrow{O_iB_i}}{l_i};$$

$$A_2 = {}^t\begin{pmatrix} -\sin\theta \cdot \cos\psi \cdot xB_i - \sin\theta \cdot \sin\psi \cdot B_i \\ B_{yx\theta} \cdot xB_i + B_{yy\theta} \cdot yB_i \\ B_{zx\theta} \cdot xB_i + B_{zy\theta} \cdot yB_i \end{pmatrix} \cdot \frac{\overrightarrow{O_iB_i}}{l_i};$$

$$A_3 = {}^t\begin{pmatrix} -\cos\theta \cdot \sin\psi \cdot xB_i + \cos\theta \cdot \cos\psi \cdot yB_i \\ B_{yx\psi} \cdot xB_i + B_{yy\psi} \cdot yB_i \\ B_{zx\psi} \cdot xB_i + B_{zy\psi} \cdot yB_i \end{pmatrix} \cdot \frac{\overrightarrow{O_iB_i}}{l_i};$$

$$A_4 = {}^t\begin{pmatrix} 1 \\ 0 \\ 0 \end{pmatrix} \cdot \frac{\overrightarrow{O_iB_i}}{l_i};$$

$$A_5 = {}^t\begin{pmatrix} 0 \\ 1 \\ 0 \end{pmatrix} \cdot \frac{\overrightarrow{O_iB_i}}{l_i};$$

$$A_6 = {}^t\begin{pmatrix} 0 \\ 0 \\ 1 \end{pmatrix} \cdot \frac{\overrightarrow{O_iB_i}}{l_i};$$

$$ct = \ddot{l}_i - (A_1 \cdot \dot{\varphi} + A_2 \cdot \dot{\theta} + A_3 \cdot \dot{\psi} + A_4 + \ddot{x} + A_5 \cdot \ddot{y} + A_6 \cdot \ddot{z})$$

Figure 6A:
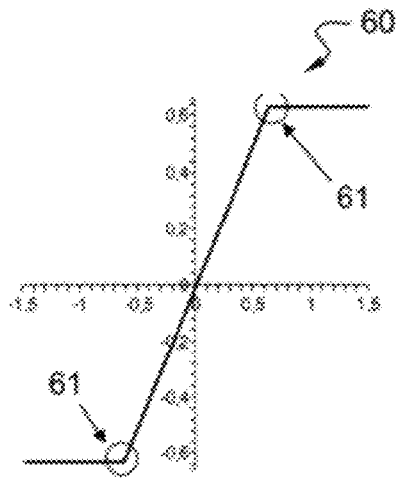
FIG. 6*a*: a first function for scaling the acceleration control.
Figure 6B:
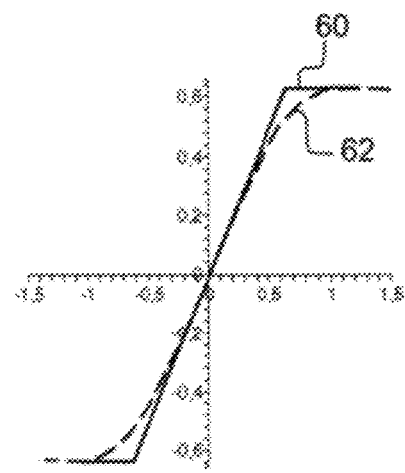
FIG. 6*b*: a second function for scaling the acceleration control.

FIGS. 6*a* and 6*b* represent functions for scaling the actuator elongations calculated as a function of the actuator length required in order to apply the optimal control.

We seek a function of the following form:

$$\text{scaling}: R^+ \to [l_{min}, l_{max}] \quad (1000)$$

with $$Avec: \text{scaling}(l) = \begin{cases} \geq l_{min}, \forall l \leq l_{min} \\ = l, \forall l \in [l_{min}, l_{max}] \\ \leq l_{max}, \forall l \geq l_{max} \\ \left(\frac{d\,\text{scaling}}{dl}\right)_{\substack{l=l_{min}\\l=l_{max}}} = 0 \end{cases}$$

To this end, we firstly define an elongation of the actuators E such that:

$$E = l - \left(\frac{l_{max} + l_{min}}{2}\right) \quad (1130)$$

with:

l: the length of an actuator;
$l_{min}$: the minimum length of an actuator;
$l_{max}$: the maximum length of an actuator.

The system (1000) then becomes:

$$\text{scaling}: R \to [-E_{max}, E_{max}] \quad (1131)$$

with

-continued $$Avec: \text{scaling}(E) = \begin{cases} \geq -E_{max}, \forall E \leq -E_{max} \\ = E, \forall E \in [-E_{max}, E_{max}] \\ \leq E_{max}, \forall E \geq E_{max} \\ \left(\dfrac{d\,scaling}{dl}\right)_{\substack{E=-E_{max} \\ E=E_{max}}} = 0 \end{cases}$$

To retrieve the function scaling(l) from the function scaling (E), it is necessary to add a difference corresponding to the mid-stroke length of the actuators.

The sought-after function scaling(E) corresponds for example to a first sought-after function 60, represented in FIG. 6a. Corner points 61 of the sought-after function 60 are thereafter replaced with continuous joins, such as represented in FIG. 6b. A second function for scaling the elongations 62 is thus obtained. The sought-after function scaling(E) is for example an odd function, of exponential type, having a maximum $E_{max} \cdot E_{max}$ can be set to a constant value.

For example the following function can be used:

$$\text{scaling}(E) = \begin{cases} -E_{max} & \text{if } E \leq -E_{max} \cdot \sqrt{e} \\ E_{max} & si\ E \geq E_{max} \cdot \sqrt{e} \\ E \cdot e^{\left(\frac{-E^2}{2 \cdot e \cdot E_{max}^2}\right)} & \text{otherwise} \\ & sinon \end{cases} \quad (1132)$$

We then verify that the proposed function fulfills the constraints imposed by the geometry of the mobile platform. To this end, we consider an interval $$[-E_{max}, E_{max}]: \text{scaling}(E) = E \cdot e^{\left(\frac{-E^2}{2 \cdot e \cdot E_{max}^2}\right)} \Rightarrow \frac{d\,scaling}{dE} \quad (1133)$$

$$= e^{\left(\frac{-E^2}{2 \cdot e \cdot E_{max}^2}\right)} \cdot \left(1 - \frac{E^2}{e \cdot E_{max}^2}\right)$$

From this we deduce:

$$\begin{cases} \left(\dfrac{d\,scaling}{dE}\right)_{E=\pm E_{max} \cdot \sqrt{e}} = 0 \\ \text{scaling}\left(-E_{max} \cdot \sqrt{e}\right) = -E_{max} \\ \text{scaling}\left(E_{max} \cdot \sqrt{e}\right) = E_{max} \end{cases} \quad (1134)$$

The function scaling(E) defined by relation (1132) therefore does indeed comply with the imposed constraints described by relation (1131).

The function scaling(E) also makes it possible to bound the velocity by changing the parameters:

$$\text{scaling}(v) = \begin{cases} & \text{if} \\ -v_{max} \text{if } si\ v \leq -v_{max} \cdot \sqrt{e} \\ v_{max} si\ v \geq v_{max} \cdot \sqrt{e} \\ v \cdot e^{\left(\frac{-v^2}{2 \cdot e \cdot v_{max}^2}\right)} & \text{otherwise} \\ & sinon \end{cases} \quad (1135)$$

The lengths can be bounded by adding a difference corresponding to a mid-stroke length of the actuators, to change the lengths into elongations:

$$\text{scaling}(l) = \quad (1136)$$

$$\begin{cases} l_{min} si\ l \leq_{if}^{if} \left(\dfrac{l_{max}+l_{min}}{2}\right) - \left(\dfrac{l_{max}-l_{min}}{2}\right) \cdot \sqrt{e} \\ l_{max} si\ l \geq \left(\dfrac{l_{max}+l_{min}}{2}\right) + \left(\dfrac{l_{max}-l_{min}}{2}\right) \cdot \sqrt{e} \\ \dfrac{l_{max}+l_{min}}{2} + \left(l - \dfrac{l_{max}-l_{min}}{2}\right) \cdot e^{\left(\frac{-\left(l-\frac{l_{min}}{2}\right)^2}{2 \cdot e \cdot \left(\frac{l_{max}-l_{min}}{2}\right)_{max}^2}\right)} & \text{otherwise} \\ & sinon \end{cases}$$

Figure 7:
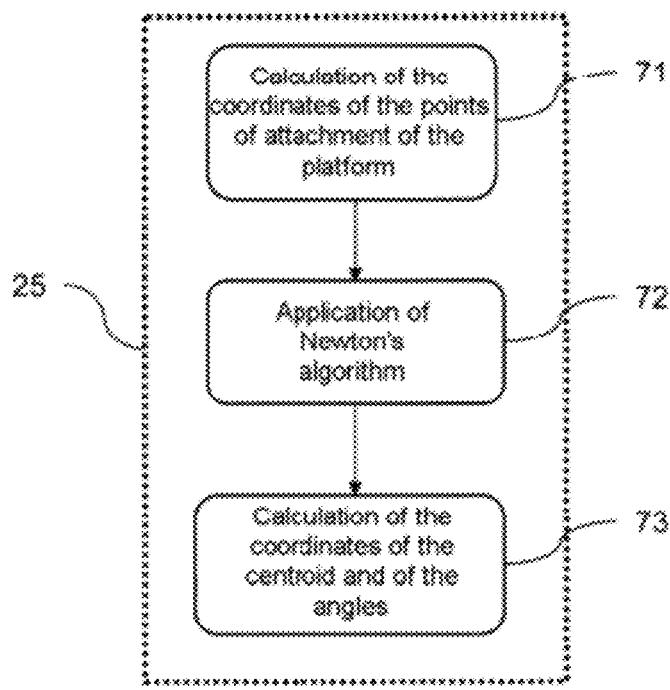
FIG. 7: a schematic of various possible calculation steps for defining inverse-kinematics parameters so as to produce the acceleration control.

FIG. 7 represents several possible steps of defining the parameters for the step of calculating the inverse kinematics 25, represented in FIG. 2. It involves, during step 25 calculating the inverse kinematics, finding six parameters ($\phi\ \theta\ \psi$ x y z) determining the position of the platform, as a function of the actuator lengths calculated in the course of the scaling step 24.

A first step 71 of the inverse kinematics calculation 25 is a step of calculating the coordinates of the attachment points of the platform in a reference frame relative to the ground. The coordinates of the points of attachment of the mobile platform in the ground reference frame have, for example, the subscript "ms". The coordinates of the points of attachment of the base of the platform in the ground reference frame have, for example, the subscript "bs". Let us take three points of attachment on the ground to make a base of the platform. For example, it is possible to choose a first point $O_1$, a second point $O_3$ and a third point $O_5$ with the first point $O_1$ as origin point. Coordinates $x_{ms_{2i}}, y_{ms_{2i}}, z_{ms_{2i}}$ of the other points of the base can be expressed as a function of the coordinates of the chosen points $O_1, O_3, O_5$, the subscript "1" corresponding to the first point $O_1$, the subscript "3" corresponding to the second point $O_3$, the subscript "5" corresponding to the third point $O_5$:

$$\forall i \in [1; 3] \begin{cases} x_{ms_{2i}} - x_{ms_1} = \lambda_{2i}(x_{ms_3} - x_{ms_1}) + \mu_{2i}(x_{ms_5} - x_{ms_1}) \\ y_{ms_{2i}} - y_{ms_1} = \lambda_{2i}(y_{ms_3} - y_{ms_1}) + \mu_{2i}(y_{ms_5} - y_{ms_1}) \\ z_{ms_{2i}} - z_{ms_1} = \lambda_{2i}(z_{ms_3} - z_{ms_1}) + \mu_{2i}(z_{ms_5} - z_{ms_1}) \end{cases} \quad (1137)$$

The system (1137) is satisfied by all the points of the platform whatever the reference frame in which the coordinates $(x_{ms_1}, y_{ms_1}, z_{ms_1}), (x_{ms_3}, y_{ms_3}, z_{ms_3}), (x_{ms_5}, y_{ms_5}, z_{ms_5})$ of the first, second and third points $O_1, O_3, O_5$ are written. This is in particular satisfied for the coordinates of the points in the reference frame tied to the mobile platform and defined by relation (1107). As all the points of the mobile platform have the same coordinate value along an axis z perpendicular to the plane of the platform, the third equation of the system (1137) does not afford any additional information. The systems to be solved are therefore as follows:

$$\forall i \in [1; 3] \begin{cases} x_{ms_{2i}} - x_{ms_1} = \lambda_{2i}(x_{ms_3} - x_{ms_1}) + \mu_{2i}(x_{ms_5} - x_{ms_1}) \\ y_{ms_{2i}} - y_{ms_1} = \lambda_{2i}(y_{ms_3} - y_{ms_1}) + \mu_{2i}(y_{ms_5} - y_{ms_1}) \end{cases} \quad (1138)$$

The systems (1138) are linear systems of two equations in two unknowns. By using Cramer's procedure to solve the systems (1138) we then obtain the values of $(\lambda_{2i}, \mu_{2i}) \forall i \in [1; 3]$.

A second step 72 of the inverse kinematics calculation 25 is the application of Newton's algorithm in an iterative manner so as to calculate the coordinates of all the points of attachment of the actuators on the mobile platform in the reference frame tied to the ground.

Initially, an expression such as described below can express the fact that the distances $D_1, D_2, D_3$ between the points of the mobile platform $B_1, B_3, B_5$:

$$\begin{cases} D_1 = (x_{ms_3} - x_{ms_1})^2 + (y_{ms_3} - y_{ms_1})^2 \\ D_2 = (x_{ms_5} - x_{ms_1})^2 + (y_{ms_5} - y_{ms_1})^2 \\ D_3 = (x_{ms_5} - x_{ms_3})^2 + (y_{ms_5} - y_{ms_3})^2 \end{cases} \quad (1139)$$

The coordinates in the mobile reference frame, such as are defined in (1107), can be used to calculate $D_1, D_2, D_3$.

Moreover:

$$\forall i \in [1;6]: l_i^2 = (xms_i - xmb_i)^2 + (yms_i - ymb_i)^2 + (zms_i - zmb_i)^2 \quad (1140)$$

with representing the lengths of actuators of the current iteration.

By combining relations (1139) and (1140), the following system is obtained:

$$F = \quad (1141)$$

$$\begin{cases} \forall i \in [1;6]: (xms_i - xmb_i)^2 + (yms_i - ymb_i)^2 + \left(\dfrac{zms_i -}{zmb_i}\right) - l_i^2 \\ (xms_3 - xms_1)^2 + (yms_3 - yms_1)^2 - D_1 \\ (xms_5 - xms_1)^2 + (yms_5 - yms_1)^2 - D_2 \\ (xms_5 - xms_3)^2 + (yms_5 - yms_3)^2 - D_3 \end{cases}$$

Next, using relations (1138), the following relation is obtained:

$$F = F(X) \quad (1142)$$

with $$X = (x_{ms_1}\ x_{ms_3}\ x_{ms_5}\ y_{ms_1}\ y_{ms_3}\ y_{ms_5}\ z_{ms_1}\ z_{ms_3}\ z_{ms_5})$$

Next, based on the following relation:

$$F(X + \Lambda_X) = F(X) + \Delta_X \cdot F'(X) \quad (1143)$$

Jacobian($F$)

with $F'(X)$=jacobien($F$)

From relation (1143), we deduce the following relation:

$$\Delta_x = F'^{-1}(X) \cdot (F(X + \Delta_x) - F(X)) \quad (1144)$$

We seek $\Delta_x / F(X + \Delta_x) = 0$, relation (1144) then becomes:

$$\Delta_x = F'^{-1}(X) \cdot (-F(X)) \quad (1145)$$

Using relation (1138), F'(X) can be expressed in the manner defined by expression (1146) described in Annex 2.

The variable X can be initialized with values arising from the previous iteration. For example, tools for the automated solution of equation systems can be used to solve the previous system and obtain a value of $\Delta_x$. The iterations performed by applying Newton's algorithm can be stopped when we have max $(|\Delta_x|) \leq 10^{-7}$, otherwise, we can put $X = X + \Delta_x$ and restart a new iteration of Newton's algorithm. A maximum number of iterations can be fixed.

Once this step has been performed, by using relations (1138), we obtain the coordinates of all the points of attachment of the actuators on the mobile platform in the reference frame tied to the ground.

A third step 73 of the inverse kinematics calculation 25 is a step of calculating the coordinates of the centroid of the mobile platform as well as the angles of displacement of the mobile platform.

Initially, the coordinates of the center of gravity of the platform are calculated:

$$G = \dfrac{1}{6} \cdot \begin{pmatrix} \sum_{i=1}^{6} xms_i \\ \sum_{i=1}^{6} yms_i \\ \sum_{i=1}^{6} zms_i \end{pmatrix} \quad (1147)$$

It is possible to calculate the coordinates of the vectors $\overline{GB_i}$ which connect the center of gravity to the various points of attachment of the mobile part of the platform.

It is then possible to create the following basis:

$$\begin{cases} Ems_1 = \dfrac{\overline{GB_1} + \overline{GB_2}}{2 \cdot xB_1} \\ Ems_2 = \dfrac{\overline{GB_1} - \overline{GB_2}}{2 \cdot yB_1} \\ Ems_3 = Ems_1 \wedge Ems_2 \end{cases} \quad (1148)$$

The basis (1148) corresponds, at an instant l=0, to the canonical basis of the reference frame tied to the ground. Using the following relation, which links the fixed reference frame and the mobile reference frame:

$$\begin{bmatrix} Ems_1 \\ Ems_2 \\ Ems_3 \end{bmatrix} = [T_{mob\text{-}fix}] \cdot \begin{bmatrix} Emm_1 \\ Emm_2 \\ Emm_3 \end{bmatrix} \quad (1149)$$

with:

$$\begin{cases} Emm_1 = [1\ 0\ 0] \\ Emm_2 = [0\ 1\ 0] \\ Emm_3 = [0\ 0\ 1] \end{cases}$$

and $T_{mob\text{-}fix}$ defined by expression (1007), from this we deduce:

$$\begin{cases} Ems_2(1)/Ems_1(1) = \tan(\psi) \\ Ems_3(1) = -\sin(\theta) \\ Ems_3(2) = \sin(\varphi) \cdot \cos(\theta) \end{cases} \Leftrightarrow \begin{cases} \psi = \tan^{-1}(Ems_2(1)/Ems_1(1)) \\ \theta = \sin^{-1}(-Ems_3(1)) \\ \varphi = \sin^{-1}(Ems_3(2)/\cos(\theta)) \end{cases} \quad (1150)$$

We have indeed therefore retrieved the coordinates as well as the angles ($\phi$ $\theta$ $\psi$ x y z) associated with the centroid of the mobile platform.

By twice differentiating the coordinates ($\phi$ $\theta$ $\psi$ x y z) we obtain the acceleration control to be applied by the mobile platform.

The acceleration control calculation method according to the invention advantageously makes it possible to realistically reproduce accelerations felt by the pilot or the driver of a vehicle in a simulator. It also makes it possible to utilize to the maximum the entirety of the dynamic resources of the motion system while avoiding reaching actuator end-of-stroke bumpers. This advantageously makes it possible to increase the lifetime of the actuators and more generally of the mobile simulation o platforms. Advantageously, the method according to the invention makes it possible to realistically reproduce extreme situations in which the actuators of the platform have an asymmetric configuration, for example in the case of missed takeoffs or following hard braking.

The direct 23 and inverse 25 kinematics calculations depend is solely on the geometry of the simulation platform used. These calculations can therefore advantageously be adapted to any simulator with motion without changing the functional architecture 30, 31 for calculating the acceleration control. Moreover, the calculations performed by the method according to the invention are exact calculations, that is to say not requiring any approximation. This advantageously makes it possible not to introduce edge effects which could impede the stability of the results produced by the method according to the invention.

The method according to the invention therefore advantageously makes it possible to improve the training of vehicle pilots by confronting them with extreme situations in a realistic manner. The vehicle pilots thus trained are therefore more able to react correctly when faced with dangerous situations, thus improving their safety and avoiding damage to the vehicles.

The method for calculating the optimal control according to the invention furthermore allows a simple calculation of the accelerations, platform related constraints being taken into account after the calculation of the optimal control generated by the vehicle's motion simulator.

The invention claimed is:

1. A method for calculating motion controls for a mobile platform of a vehicle simulator by use of calculated accelerations, calculated by a process for simulating behavior of a vehicle, said method comprising the steps of:
    filtering the calculated accelerations by use of a filter constructed according to a mathematical model of human perception of a motion, to produce filtered acceleration controls to be applied by the mobile platform;
    calculating successive positions of the mobile platform as a function of the filtered acceleration controls;
    scaling the successive positions of the mobile platform, as a function of physical limitations of the mobile platform, to produce scaled successive positions of the mobile platform; and
    calculating acceleration controls to be applied by the mobile platform, as a function of the scaled successive positions of the mobile platform, to produce calculated acceleration controls.

2. The method as claimed in claim 1, wherein the successive positions of the mobile platform are provided by positions of a geometric center of the mobile platform and by lengths of actuators moving the mobile platform.

3. The method as claimed in claim 2, wherein the lengths of the actuators is scaled by a first scaling function scaling(l) determined in accordance with the following relationships:
    scaling(l)$\geq l_{min}$, for all $l \leq l_{min}$;
    scaling(l)=l, for all $l_{min} \leq l \leq l_{max}$;
    scaling(l)$\leq l_{max}$, for all $l \geq l_{max}$; and $$\left(\frac{d\,scaling}{dl}\right)_{\substack{l=l\min \\ l=l\max}} = 0,$$

wherein:
    l comprises a length of an actuator;
    $l_{min}$ comprises a minimum length implemented by the mobile platform; and
    $l_{max}$ comprises a maximum length implemented by the mobile platform.

4. The method as claimed in claim 1, wherein the step of scaling uses limitations on one or more rates of elongation of actuators of the mobile platform.

5. The method as claimed in claim 4, wherein the limitations on rate of elongation of the actuators are taken into account using a second scaling function $scaling_v$ (v) determined in accordance with the following relationships:
    $scaling_v(v) \geq v_{min}$, for all $v \leq v_{min}$;
    $scaling_v(v) = v$, for all $v_{min} \leq v \leq v_{max}$;
    $scaling_v(v) \leq v_{max}$, for all $v \geq v_{max}$; and $$\left(\frac{d\,scaling_v}{dv}\right)_{\substack{v=v\min \\ v=v\max}} = 0,$$

wherein:
    v comprises a rate of elongation of an actuator;
    $v_{min}$ comprises a minimum elongation rate by the actuators of the mobile platform; and
    $v_{max}$ max comprises a maximum elongation rate by the actuators of the mobile platform.

6. The method as claimed in claim 1 further comprising the steps of:
    comparing the calculated accelerations to a threshold value below which the accelerations are no longer perceived by a human being; and
    applying calculated accelerations above the threshold value give a, in order to produce to produce a calculated acceleration control.

7. The method as claimed in claim 1, wherein the calculating acceleration controls to be applied by the mobile platform further comprises the step of applying a Newton algorithm in an iterative manner.

8. A device for calculating motion controls for a mobile platform for a vehicle simulator comprising:
    a first circuit configured to calculate acceleration controls to be applied by the mobile platform, the first circuit comprising a filter constructed according to a mathematical model of human perception of a motion, in order to filter accelerations provided by a process for simulating the behavior of the vehicle; and
    a second circuit configured to calculate controls to be applied by the mobile platform as a function of physical limitations of the mobile platform, the second circuit comprising:
        a first circuit module configured to calculate successive positions of the mobile platform as a function of the accelerations of controls to be applied by the mobile platform, to produce positions calculated as a function of the physical limitations of the mobile platform;
a second circuit module configured to scale the positions calculated as a function of the physical limitations of the mobile platform, to produce scaled positions; and
a third circuit module configured to calculate accelerations to be applied by the mobile platform as a function of the scaled positions.

9. The device as claimed in claim 8, wherein the positions of the mobile platform are provided by the positions of the geometric center of the mobile platform and by the lengths of actuators of the mobile platform.

10. The device as claimed in claim 9, wherein the lengths of the actuators is scaled by a first scaling function scaling (l) determined in accordance with the following relationships:
scaling(l)$\geq l_{min}$, for all $l \leq l_{min}$;
scaling(l)=l, for all $l_{min} \leq l \leq l_{max}$;
scaling(l)$\leq l_{max}$, for all $l \geq l_{max}$; and $$\left(\frac{d\,scaling}{d\,l}\right)_{\substack{l=lmin \\ l=lmax}} = 0,$$

wherein:
l comprises a length of an actuator;
$l_{min}$ comprises a minimum length implemented by the mobile platform; and
$l_{max}$ comprises a maximum length implemented by the mobile platform.

11. The device as claimed in claim 8, wherein the second circuit uses limitations on one or more rates of elongation of actuators of the mobile platform.

12. The device as claimed in claim 11, wherein the limitations on rate of elongation of the actuators are taken into account using a second scaling function $scaling_v$ (v) determined in accordance with the following relationships:
$scaling_v(v) \geq v_{min}$, for all $v \leq v_{min}$;
$scaling_v(v) = v$, for all $v_{min} \leq v \leq v_{max}$;
$scaling_v(v) \leq v_{max}$, for all $v \geq v_{max}$; and $$\left(\frac{d\,scaling_v}{d\,v}\right)_{\substack{v=vmin \\ v=vmax}} = 0,$$

wherein:
v comprises a rate of elongation of an actuator;
$v_{min}$ comprises a minimum elongation rate by the actuators of the mobile platform; and
$v_{max}$ comprises a maximum elongation rate by the actuators of the mobile platform.

* * * * *